US012658817B2

(12) United States Patent
Yaguchi

(10) Patent No.: US 12,658,817 B2
(45) Date of Patent: Jun. 16, 2026

(54) INTEGRATED CIRCUIT AND POWER SUPPLY CIRCUIT

(71) Applicant: FUJI ELECTRIC CO., LTD., Kawasaki (JP)

(72) Inventor: Yukihiro Yaguchi, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 217 days.

(21) Appl. No.: 18/676,097

(22) Filed: May 28, 2024

(65) Prior Publication Data

US 2025/0030354 A1     Jan. 23, 2025

(30) Foreign Application Priority Data

Jul. 18, 2023    (JP) ................................. 2023-116971

(51) Int. Cl.
H02M 1/42         (2007.01)
H02M 1/00         (2006.01)
(Continued)

(52) U.S. Cl.
CPC ......... H02M 7/217 (2013.01); H02M 1/0009 (2021.05); H02M 1/12 (2013.01);
(Continued)

(58) Field of Classification Search
CPC .... H02M 1/42; H02M 1/4208; H02M 1/4216; H02M 1/4225; H02M 1/4233; H02M 1/4241; H02M 1/425; H02M 1/4258;

H02M 1/4266; H02M 2001/4275; H02M 2001/4283; H02M 2001/4291; H02M 5/2573; H02M 1/081; H02M 5/293;
(Continued)

(56) References Cited

U.S. PATENT DOCUMENTS 5,559,395  A      9/1996  Venkitasubrahmanian et al.
9,054,597  B2 *   6/2015  Zhao ....................... H02M 1/42
(Continued)

FOREIGN PATENT DOCUMENTS

JP         S49-104549 A      10/1974
JP         H10-501651 A       2/1998
(Continued)

*Primary Examiner* — Jeffrey A Gblende
(74) *Attorney, Agent, or Firm* — Rabin & Berdo, P.C.

(57) ABSTRACT

An integrated circuit for a power supply circuit that generates an output voltage from an AC voltage. The power supply circuit includes a full-wave rectifier circuit rectifying the AC voltage, a filter receiving the rectified voltage, an inductor receiving a voltage from the filter, and a transistor controlling an inductor current flowing through the inductor. The integrated circuit is configured to switch the transistor, and comprises: a terminal configured to receive a first voltage corresponding to a sum of a first current, which flows from the filter to a ground, and the inductor current; and a switching control circuit configured to turn on the transistor in response to the inductor current becoming smaller than a predetermined value, and turn off the transistor such that a peak value of the sum and the rectified voltage have waveforms that are in phase, and are proportional in amplitude, to each other.

15 Claims, 15 Drawing Sheets

(51) Int. Cl.
  *H02M 1/12*  (2006.01)
  *H02M 1/32*  (2007.01)
  *H02M 1/44*  (2007.01)
  *H02M 7/217*  (2006.01)

(52) U.S. Cl.
  CPC .......... *H02M 1/32* (2013.01); *H02M 1/4208*
  (2013.01); *H02M 1/44* (2013.01)

(58) Field of Classification Search
  CPC .......... H02M 7/12; H02M 3/10; H02M 3/125;
  H02M 3/13; H02M 3/135; H02M 3/145;
  H02M 3/15; H02M 3/155; H02M 3/156;
  H02M 3/157; H02M 3/158; H02M 1/346;
  H02M 3/1588; H02M 2003/1566; H02M
  3/1582; H02M 3/1584; H02M 2003/1557;
  H02M 1/0032; H02M 7/217; H02M
  1/0025; H02M 1/0045; H02M 1/0009;
  H02M 1/08; H02M 1/088; H02M 1/0048;
  G05F 1/00; G05F 1/10; G05F 1/12; G05F
  1/46; G05F 1/455; G05F 1/45; G05F
  1/445; G05F 1/66; G05F 1/40; G05F
  1/42; G05F 1/44; G05F 1/462; G05F
  1/52; G05F 1/56; G05F 3/10; G05F 3/16;
  G05F 3/18; G05F 3/185; G05F 3/20;
  G05F 3/26; G05F 3/30; G05F 3/205;
  G05F 3/22; G05F 3/24; G05F 3/222;
  G05F 3/242; G05F 3/225; G05F 3/227;
  G05F 3/245; G05F 3/247; G05F 3/262;
  G05F 3/265; G05F 3/267; G05F 1/575;
  H05B 39/048; B23K 11/24; H04B
  2215/069

See application file for complete search history.

(56)  References Cited

U.S. PATENT DOCUMENTS

| | | | | |
|---|---|---|---|---|
| 11,165,337 | B2 * | 11/2021 | Hiasa | H02M 1/4208 |
| 12,021,448 | B2 * | 6/2024 | Ishibashi | H02M 1/4233 |
| 2010/0254549 | A1 | 10/2010 | Onishi | |
| 2015/0263644 | A1 | 9/2015 | Fu | |
| 2016/0190912 | A1 * | 6/2016 | Lim | H02M 1/4225 |
| | | | | 363/84 |
| 2019/0089242 | A1 | 3/2019 | Iijima et al. | |
| 2019/0379288 | A1 | 12/2019 | Chaput et al. | |

FOREIGN PATENT DOCUMENTS

| | | | |
|---|---|---|---|
| JP | 2007-181342 | A | 7/2007 |
| JP | 2010-245728 | A | 10/2010 |
| JP | 2013-505688 | A | 2/2013 |
| JP | 2015-177636 | A | 10/2015 |
| JP | 2015-177719 | A | 10/2015 |
| JP | 2017-508433 | A | 3/2017 |
| JP | 2018-528756 | A | 9/2018 |
| JP | 2020-506654 | A | 2/2020 |
| JP | 2022-075359 | A | 5/2022 |
| WO | 2011/032287 | A1 | 3/2011 |
| WO | 2017/058763 | A1 | 4/2017 |
| WO | 2018/002998 | A1 | 1/2018 |

* cited by examiner

INTEGRATED CIRCUIT AND POWER SUPPLY CIRCUIT

CROSS-REFERENCE TO RELATED APPLICATIONS

The present application claims priority pursuant to 35 U.S.C. § 119 from Japanese patent application number 2023-116971 filed on Jul. 18, 2023, the entire disclosure of which is hereby incorporated by reference herein.

BACKGROUND

Technical Field

The present disclosure relates to an integrated circuit and a power supply circuit.

Description of the Related Art

Power factor correction circuits configured to generate an output voltage of a target level from an alternating current (AC) voltage generally include an integrated circuit that switches a switching element such that the waveform of the peak value of an inductor current will be similar to the waveform of a full-wave rectified voltage, to thereby improve the power factor (see, for example, Japanese Patent Application Publication No. 2007-181342).

Such a power factor correction circuit may include an input filter at a stage subsequent to the full-wave rectifier circuit.

In such a case, since current flows through a capacitor included in the input filter, the current inputted to the power factor correction circuit results in including the current to the capacitor and the inductor current.

Thus, in the case where only the waveform of the peak value of the inductor current is adjusted, the total harmonic distortion (THD) of the current inputted to the power factor correction circuit may not be sufficiently improved.

SUMMARY

A first aspect of the present disclosure is an integrated circuit for a power supply circuit that generates an output voltage of a target level from an alternating current (AC) voltage inputted thereto, the power supply circuit including a full-wave rectifier circuit configured to rectify the AC voltage to thereby generate a rectified voltage, a filter configured to receive the rectified voltage from the full-wave rectifier circuit, an inductor configured to receive a voltage from the filter, and a transistor configured to control an inductor current flowing through the inductor, the integrated circuit being configured to switch the transistor, the integrated circuit comprising: a first terminal configured to receive a first voltage corresponding to a sum of a first current, which flows from the filter to a ground, and the inductor current, the sum being a second current; and a switching control circuit configured to turn on the transistor, in response to the inductor current becoming smaller than a predetermined value, and turn off the transistor based on the first voltage such that a waveform of a peak value of the second current and a waveform of the rectified voltage are in phase, and are proportional in amplitude, to each other.

A second aspect of the present disclosure is a power supply circuit configured to generate an output voltage of a target level from an alternating current (AC) voltage inputted thereto, the power supply circuit comprising: a full-wave rectifier circuit configured to rectify the AC voltage, to thereby generate a rectified voltage; a filter configured to receive the rectified voltage; a resistor provided between a terminal of the full-wave rectifier circuit on a low potential side thereof and a ground; an inductor configured to receive a voltage from the filter; a transistor configured to control an inductor current flowing through the inductor; and an integrated circuit configured to switch the transistor, wherein the integrated circuit includes: a first terminal configured to receive a first voltage corresponding a sum of a first current, which flows from the filter to the ground, and the inductor current, the sum being a second current, and a switching control circuit configured to turn on the transistor, in response to the inductor current becoming smaller than a predetermined value, and turn off the transistor based on the first voltage such that a waveform of a peak value of the second current and a waveform the rectified voltage are in phase, and are proportional in amplitude, to each other, and the first terminal is connected to the resistor and the terminal of the full-wave rectifier circuit.

A third aspect of the present disclosure is an integrated circuit for a power supply circuit that generates an output voltage of a target level from an alternating current (AC) voltage inputted thereto, the power supply circuit including a full-wave rectifier circuit configured to rectify the AC voltage to thereby generate a rectified voltage, a filter configured to receive the rectified voltage from the full-wave rectifier circuit, an inductor configured to receive a voltage from the filter, a transistor configured to control an inductor current flowing through the inductor, and a current detection unit provided between the filter and the full-wave rectifier circuit, the integrated circuit being configured to switch the transistor, the integrated circuit comprising: a first terminal configured to receive a first voltage generated at the current detection unit, the first voltage corresponding to a sum of a first current, which flows from the filter to a ground, and the inductor current, the sum being a second current; and a switching control circuit configured to turn on the transistor, in response to the inductor current becoming smaller than a predetermined value, and turn off the transistor, based on a target value of a peak value of the second current, the target value corresponding to the output voltage and the first voltage.

Note that the above summary of the disclosure does not list all of the features of the present disclosure. Subcombinations of these feature groups may also be the disclosure.

BRIEF DESCRIPTION OF THE DRAWINGS

FIG. 1 is a diagram illustrating a configuration example of an AC-DC converter 10a.

FIG. 5 is a diagram illustrating a configuration example of a power factor correction IC 29a.

FIG. 9 is a diagram illustrating an operation of a power factor correction IC 29a.

DETAILED DESCRIPTION

Figure 1:
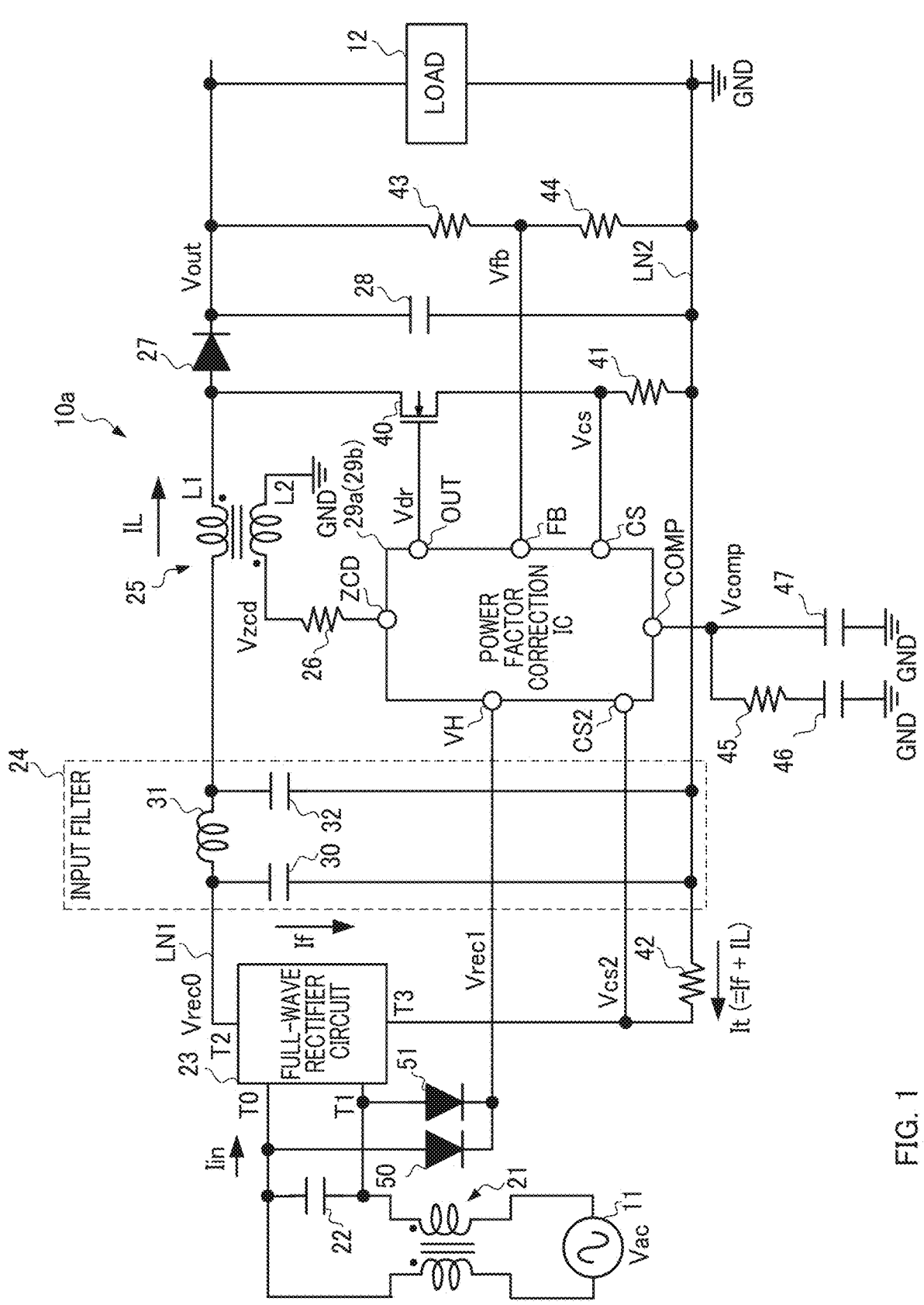

Hereinafter, the present disclosure will be described through embodiments of the disclosure. However, the following embodiments do not limit the disclosure according to the scope of the claims. In addition, not all the combinations of the features described in the embodiments are necessarily essential for solution in the disclosure. Further, the same or equivalent constituent elements, members, and the like illustrated in the drawings are given the same reference numerals, and repetitive description is omitted as appropriate.

Herein, it is assumed that when the term "connect" is used, it means to "electrically connect" unless otherwise noted. Also, herein, a high logic level of a voltage or a signal is referred to as high or high level, and a low logic level of a voltage or a signal is referred to as low or low level.

FIG. 1 is a diagram illustrating a configuration example of an AC-DC converter 10*a*. The AC-DC converter 10*a* is a boost chopper power supply circuit that generates an output voltage Vout at a target level from an alternating-current (AC) voltage Vac of an AC power supply 11. The AC-DC converter 10*a* applies the output voltage Vout to a load 12.

Here, the AC power supply 11 is a commercial AC power supply to apply the AC voltage Vac to the AC-DC converter 10*a*. The AC voltage Vac is, for example, a voltage in a range from 100 V to 277 V with a frequency in a range from 50 Hz to 60 Hz.

Further, the load 12 is, for example, a DC-DC converter or an electronic device to operate on a direct-current (DC) voltage.

<<<Configuration of AC-DC Converter 10*a*>>

The AC-DC converter 10*a* includes a choke coil 21, capacitors 22, 28, 46, and 47, a full-wave rectifier circuit 23, an input filter 24, a transformer 25, resistors 26, and 41 to 45, diodes 27, 50, and 51, and power factor correction IC 29*a*, and a metal-oxide-semiconductor (MOS) transistor 40.

==Input to Full-Wave Rectifier Circuit 23==

The choke coil 21 and the capacitor 22 remove noise from the voltage Vac and current supplied from the AC power supply 11 to the full-wave rectifier circuit 23. The voltage obtained by removing noise from the voltage Vac and an input current Iin are supplied from the AC power supply 11 to the full-wave rectifier circuit 23 through the choke coil 21 and the capacitor 22.

==Configuration from Full-Wave Rectifier Circuit 23 to Load 12==

The full-wave rectifier circuit 23 full-wave rectifies the predetermined AC voltage Vac with noise removed applied to terminals T0 and T1 thereof, to thereby apply a resultant voltage as a rectified voltage Vrec0 from a terminal T2 on the high-potential side to the input filter 24 through a line LN1. Meanwhile, the full-wave rectifier circuit 23 further has a terminal T3 on the low potential side to which a ground line LN2 is connected through the resistor 42 (described later). Note that the full-wave rectifier circuit 23 is a typical diode bridge circuit including four diodes.

The input filter 24 is configured as a differential mode filter, that is, an n-type filter including capacitors 30 and 32, and an inductor 31, and smooths the rectified voltage Vrec0 applied by the full-wave rectifier circuit 23, to thereby remove noise. The rectified voltage Vrec0 that has been filtered by the input filter 24 to remove noise is applied to a main coil L1 of the transformer 25.

Note that the current flowing from the input filter 24 to the ground, that is, the ground line LN2, is defined as a current If. Further, a description has been given of an example in which a differential mode filter is used as the input filter 24, however, for example, only the capacitor 30 may be used to smooth the rectified voltage Vrec0.

The transformer 25 includes the main coil L1 and an auxiliary coil L2 magnetically coupled to the main coil L1. Note that the auxiliary coil L2 according to an embodiment of the present disclosure is formed by winding such that the voltage generated at the auxiliary coil L2 has a polarity opposite to that of the voltage generated at the main coil L1.

The auxiliary coil L2 is connected to a terminal ZCD of the power factor correction IC 29*a* (described later) through the resistor 26. Because the current corresponding to an inductor current IL flowing through the main coil L1 flows through the auxiliary coil L2, a voltage Vzcd corresponding to the inductor current IL is applied to the terminal ZCD.

The main coil L1 of the transformer 25 configures a boost chopper circuit together with the MOS transistor 40 (described later), the diode 27, and the capacitor 28. Accordingly, the charge voltage of the capacitor 28 is boosted by the DC output voltage Vout, and a resultant voltage is supplied to the load 12.

The power factor correction IC 29*a* is an integrated circuit that controls switching of the NMOS transistor 40 such that the output voltage Vout reaches a target level (for example, 400 V) while improving the power factor of the AC-DC converter 10*a*. The power factor correction IC 29*a* drives the MOS transistor 40, based on the current If flowing from the input filter 24 to the ground line LN2, the inductor current IL flowing through the main coil L1, and the output voltage Vout.

The power factor correction IC 29*a* has terminals CS, CS2, COMP, FB, OUT, ZCD, and VH. Note that the power factor correction IC 29*a* has terminals other than the terminals (for example, a power supply terminal, a GND terminal, and the like) CS, CS2, COMP, FB, OUT, ZCD, and VH, but these terminals are omitted in the drawings.

The NMOS transistor 40 is a power transistor to control the power to the load 12 of the AC-DC converter 10*a*. Specifically, the MOS transistor 40 controls the inductor current IL flowing through the main coil L1 of the transformer 25.

The NMOS transistor 40 in an embodiment of the present disclosure is a Metal Oxide Semiconductor (MOS) transistor, but it is not limited thereto. That is, the NMOS transistor 40 may be, for example, a bipolar transistor instead, as long as the transistor can control the power. Here, the gate electrode of the NMOS transistor 40 is connected to the terminal OUT of the power factor correction IC 29*a*.

A voltage Vdr is applied to the gate electrode of the MOS transistor 40 from the power factor correction IC 29*a*. The power factor correction IC 29*a* controls the timing at which the voltage level of the voltage Vdr is changed, to thereby control the power to the load 12.

The resistor 41 generates the voltage Vcs corresponding to the drain-source current of the MOS transistor 40. Since the drain-source current of the MOS transistor 40 changes according to the inductor current IL, the inductor current IL can be detected by detecting the voltage Vcs generated at the resistor 41. The resistor 41 has one end connected to the source electrode of the MOS transistor 40, and the other end that is connected to the ground line LN2 and is grounded. The voltage Vcs generated across the resistor 41 is applied to the terminal CS. Note that the terminal CS corresponds to a "second terminal".

The resistor 42 is a resistor to detect a current It (It=If+IL) corresponding to the sum of the current If and the inductor current IL. The resistor 42 is provided between the terminal T3 of the full-wave rectifier circuit 23 and the ground line LN2, and the voltage Vcs2 generated across the resistor 42 is applied to the terminal CS2 of the power factor correction IC 29a.

Note that since the resistor 42 and the terminal T3 of the full-wave rectifier circuit 23 are connected to the terminal CS2, the voltage Vcs2 results in a negative voltage corresponding to the sum of the current If and the inductor current IL. Further, the terminal CS2 corresponds to a "first terminal", the current If corresponds to a "first current", the current It corresponds to a "second current", and the voltage Vcs2 corresponds to a "first voltage". Further, the resistor 42 corresponds to a "current detection unit".

The resistors 43 and 44 configure a voltage divider circuit, to thereby generate a feedback voltage Vfb that is used in switching the MOS transistor 40, according to the output voltage Vout. The voltage divider circuit applies, to the terminal FB of the power factor correction IC 29a, the voltage Vfb obtained by dividing as the feedback voltage.

The resistor 45 and the capacitors 46 and 47 are elements for phase compensation used for feedback-control. The resistor 45 and the capacitor 46 are provided in series between the terminal COMP and the ground. Further, the capacitor 47 is provided in parallel with the resistor 45 and the capacitor 46.

The anodes of the diodes 50 and 51 are respectively connected to the inputs of the full-wave rectifier circuit 23, and the cathodes of the diodes 50 and 51 are connected to each other. A rectified voltage Vrec1 is generated at the cathodes of the diodes 50 and 51, and the rectified voltage Vrec1 is applied to the terminal VH of the power factor correction IC 29a.

Further, the power factor correction IC 29a, which will be described later in detail, turns on the MOS transistor 40, in response to the inductor current IL flowing through the main coil L1 of the transformer 25 reaching a predetermined value (for example, substantially zero, hereinafter, "substantially zero" will be referred to as zero). Then, the power factor correction IC 29a turns off the MOS transistor 40, in response to the current It corresponding to the sum of the current If and the inductor current IL reaching a target value that is determined based on the voltage Vrec1 and the voltage Vfb (specifically, the voltage Vcomp at the terminal COMP corresponding to the voltage Vfb).

With a configuration as such, the power factor correction IC 29a can match the phase of the current It corresponding to the sum of the current If and the inductor current IL with the phase of the AC voltage, thereby being able to improve the power factor. Note that although there is a loss in the AC-DC converter 10a, the current It is substantially equal to the input current Iin.

<<Configuration of Typical AC-DC Converter 500>>

A description has been given of the AC-DC converter 10a including the resistor 42 provided between the terminal T3 of the full-wave rectifier circuit 23 and the ground line LN2 to detect the current If and the inductor current IL. The following describes a typical AC-DC converter 500 using a power factor correction IC 100 that turns off the MOS transistor 40 based on the inductor current IL and the output voltage Vout.

Figure 2:
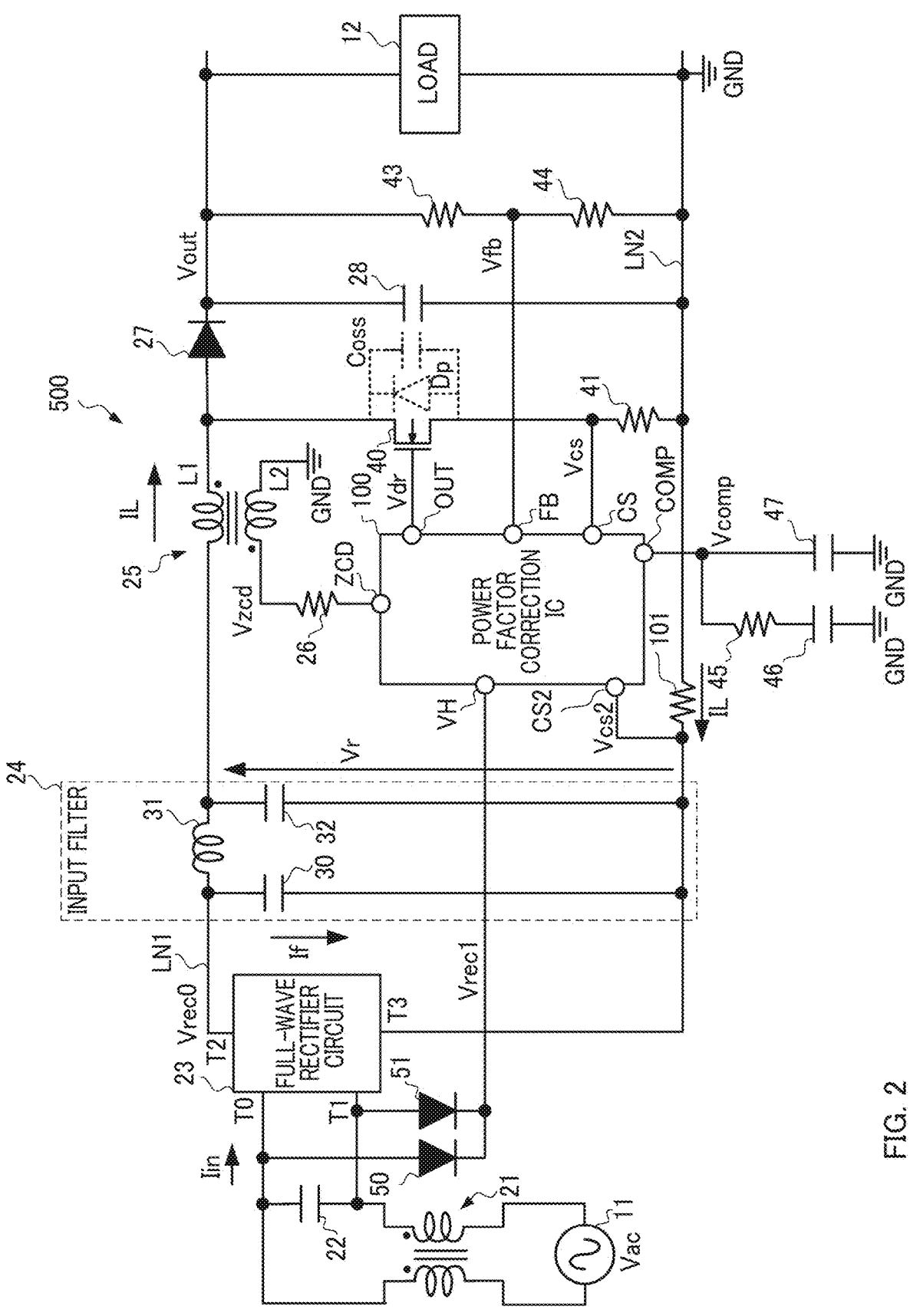
FIG. 2 is a diagram illustrating a configuration example of a typical AC-DC converter 500.

FIG. 2 is a diagram illustrating a configuration example of the AC-DC converter 500. The AC-DC converter 500 is different from the AC-DC converter 10a in that the power factor correction IC 100 and a resistor 101 are added after removing the power factor correction IC 29a and the resistor 42.

The power factor correction IC 100 is an integrated circuit that operates based on the voltage Vcs2 generated at the resistor 101 provided between the input filter 24 and the ground line LN2, and improves the power factor as follows, as in the power factor correction IC 29a which will be described later in detail.

The power factor correction IC 100 turns on the NMOS transistor 40, in response to the inductor current IL flowing through the main coil L1 of the transformer 25 reaching zero. Then, the power factor correction IC 100 turns off the MOS transistor 40, in response to the inductor current IL reaching the target value determined based on the voltage Vrec1 and the feedback voltage Vfb (specifically, the voltage Vcomp at the terminal COMP corresponding to the voltage Vfb). Note that the power factor correction IC 100 determines the timing at which the MOS transistor 40 is turned off, based on the voltage Vcs2 that is generated at the resistor 101 by virtue of the inductor current IL.

<<<General Operation of Typical AC-DC Converter 500>>>

Figure 3:
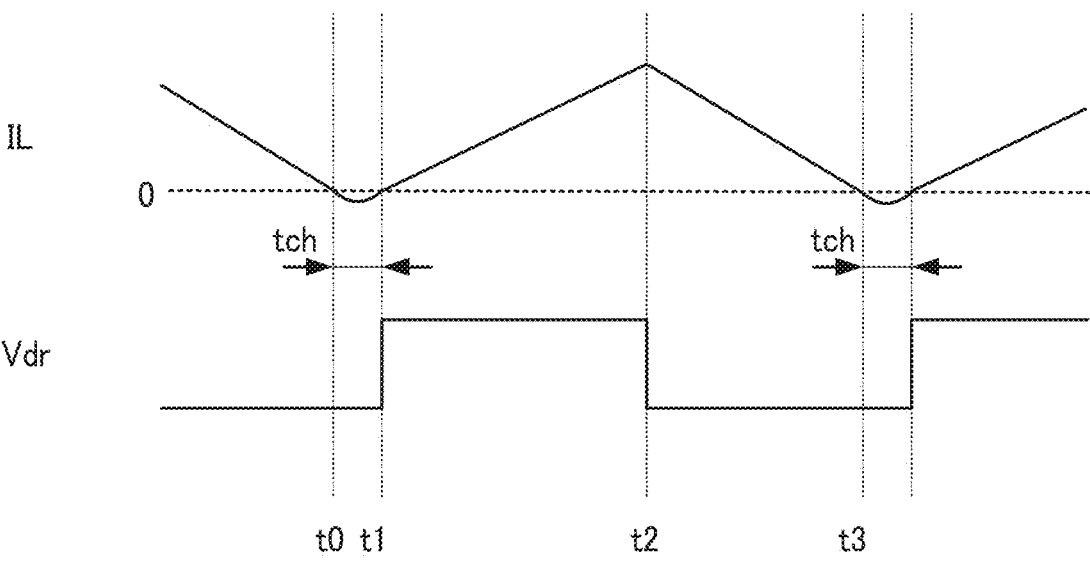
FIG. 3 is a diagram illustrating an example of an operation of an AC-DC converter 500.

FIG. 3 is a diagram illustrating the relationship between the inductor current IL and the voltage Vdr when the rectified voltage Vrec0 is high.

At time t0, the inductor current IL flowing through the coil L1 reaches zero.

At time t1 at which a delay period tch has elapsed since time t0, the power factor correction IC 100 applies, to the MOS transistor 40, the voltage Vdr to turn on the MOS transistor 40. In response to turning on of the power transistor 40, the inductor current IL increases.

At time t2 at which the inductor current IL reaches the target value, the power factor correction IC 100 applies, to the MOS transistor 40, a voltage Vdr to turn off the MOS transistor 40. Upon turning off of the power transistor 40, the inductor current IL decreases.

At time t3, the inductor current IL reaches zero, and the same operation is repeated therefrom.

Here, in response to the MOS transistor 40 being turned off and the inductor current IL reaching zero, the voltage at the coil L1 on the input filter 24 side drops below the charge voltage Vr, because the charge voltage Vr of the capacitors 30 and 32 included in the input filter 24 is sufficiently high. Thus, the current If to charge the capacitors 30 and 32 does not flow from the coil L1. Accordingly, resonance occurs between the output capacitance Coss of the MOS transistor 40 and the coil L1.

That is, when the rectified voltage Vrec0 is high, a resonant current flows between the coil L1 and the output capacitor Coss, so that a negative current does not flow from the coil L1 to the capacitors 30 and 32, other than the resonant current.

Accordingly, the power factor correction IC 100 is able to turn on the MOS transistor 40 in a state in which the voltage at the drain electrode of the MOS transistor 40 has dropped, if the MOS transistor 40 is turned on with a delay corresponding to the delay period tch from the inductor current IL reaching zero. This suppresses switching loss of the MOS transistor 40. Note that the delay period tch is a time period corresponding to a half of a resonance period.

Meanwhile, when the rectified voltage Vrec0 is low, the AC-DC converter 500 is not able to operate as described with reference to FIG. 3. The following describes such a case with reference to FIG. 4.

Figure 4:
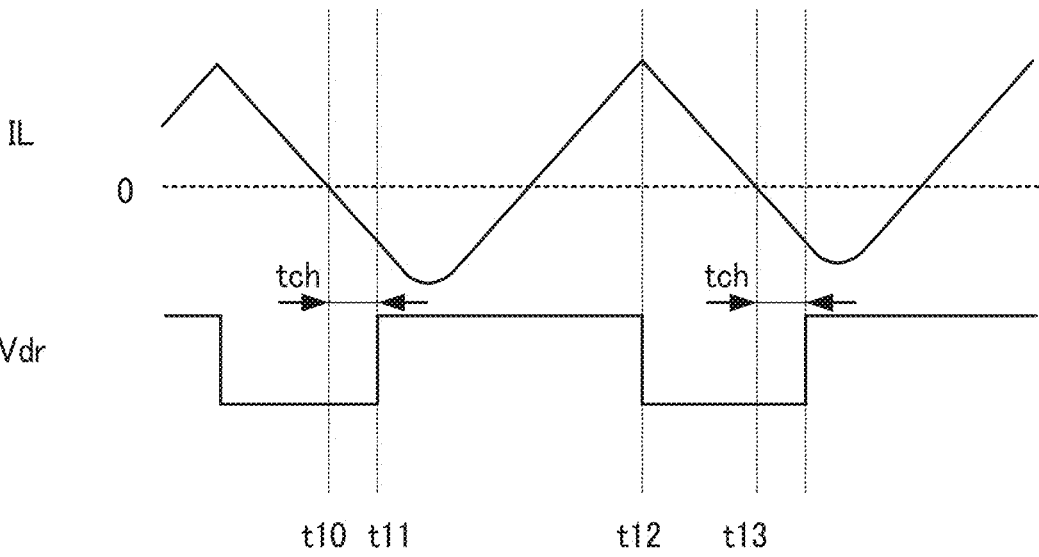
FIG. 4 is a diagram illustrating an example of an operation of an AC-DC converter 500.

FIG. 4 is a diagram illustrating the relationship between the voltage Vdr and the inductor current IL when the rectified voltage Vrec0 is low.

At time t10, the inductor current IL flowing through the coil L1 reaches zero. After the inductor current IL reaches zero, a resonant operation starts between the coil L1 and the output capacitance Coss. When the rectified voltage Vrec0 is low and the charge voltage Vr with which the capacitors 30 and 32 of the input filter 24 are charged is low, the voltage at the coil L1 on the input filter 24 side rises higher than the charge voltage Vr, and the inductor current IL in the negative direction flows from the coil L1 to the capacitors 30 and 32.

Then, the capacitors 30 and 32 are charged with the inductor current IL.

At time t1*l* at which the delay time tch has elapsed since time t10, the power factor correction IC 100 applies, to the MOS transistor 40, the voltage Vdr to turn on the MOS transistor 40. However, the inductor current IL in the negative direction flows through a parasitic diode Dp, the coil L1, and the capacitors 30 and 32 in this order, until the voltage at the coil L1 on the input filter 24 side becomes equal to the charge voltage Vr.

In this case, although the MOS transistor 40 is on, the inductor current IL in the positive direction flowing from the coil L1 to the MOS transistor 40 does not flow through the coil L1. Thereafter, in response to the voltage at the coil L1 on the input filter 24 side becoming equal to the charge voltage Vr, the inductor current IL in the negative direction stops flowing, and the inductor current IL starts to flow in the positive direction.

At time t12 at which the inductor current IL reaches the target value, the power factor correction IC 100 applies, to the MOS transistor 40, the voltage Vdr to turn off the MOS transistor 40. Upon turning off of the MOS transistor 40, the inductor current IL decreases.

At time t13, the inductor current IL reaches zero, and the same operation is repeated therefrom.

From the above, even if the MOS transistor 40 is turned on, a substantial ON period during which the inductor current IL flows in the positive direction decreases. In this case, the capacitors 30 and 32 are not sufficiently discharged, and the voltage difference between the AC voltage Vac and the charge voltage Vr decreases, and thus the diodes included in the full-wave rectifier circuit 23 are less likely to pass current.

This may cause the full-wave rectifier circuit 23 to be unable to sufficiently supply current, when the rectified voltage Vrec0 is low (that is, the AC voltage Vac is low). Then, as the MOS transistor 40 continues to be on, the inductor current IL gradually flows in the positive direction, and the capacitors 30 and 32 are discharged. Then, with a drop in the charge voltage Vr, the diodes included in the full-wave rectifier circuit 23 are fully turned on, to thereby start to supply necessary current.

When the operation is performed as such, the waveform of the input current Iin may not be similar to the waveform of the AC voltage Vac. This phenomenon may occur because the resistor 101 detects only the inductor current IL.

Further, in response to the MOS transistor 40 being switched using only the inductor current IL while ignoring the current If, the current value of the input current Iin increases larger than the current value of the inductor current IL by the amount corresponding to the charge current If, when the rectification voltage Vrec0 is low. This may lead to distortion of the input current Iin with respect to the AC voltage Vac, which may deteriorate the power factor and cause harmonic distortion as well.

Meanwhile, in the AC-DC converter 10*a*, with the provision of the resistor 42, it is possible to detect the current It corresponding to the sum of the inductor current IL and the current If to charge the capacitors 30 and 32 of the input filter 24.

Accordingly, in the AC-DC converter 10*a*, even if the rectified voltage Vrec0 is low and the charge current If to the capacitors 30 and 32 is generated, this can be taken into consideration. Note that when the rectified voltage Vrec0 is high, the charge current If is less likely to be generated and the current It becomes substantially equal to the inductor current IL, and thus distortion of the input current Iin is less likely to occur.

Further, with the current If being considered together with the inductor current IL, the distortion of the input current Iin with respect to the AC voltage Vac is reduced, and the total harmonic distortion is improved, which may improve the power factor of the AC-DC converter 10*a*. Accordingly, the following describes the details of the power factor correction IC 29*a* capable of improving the total harmonic distortion as such.

==Configuration of Power Factor Correction IC 29*a*==

Figure 5:
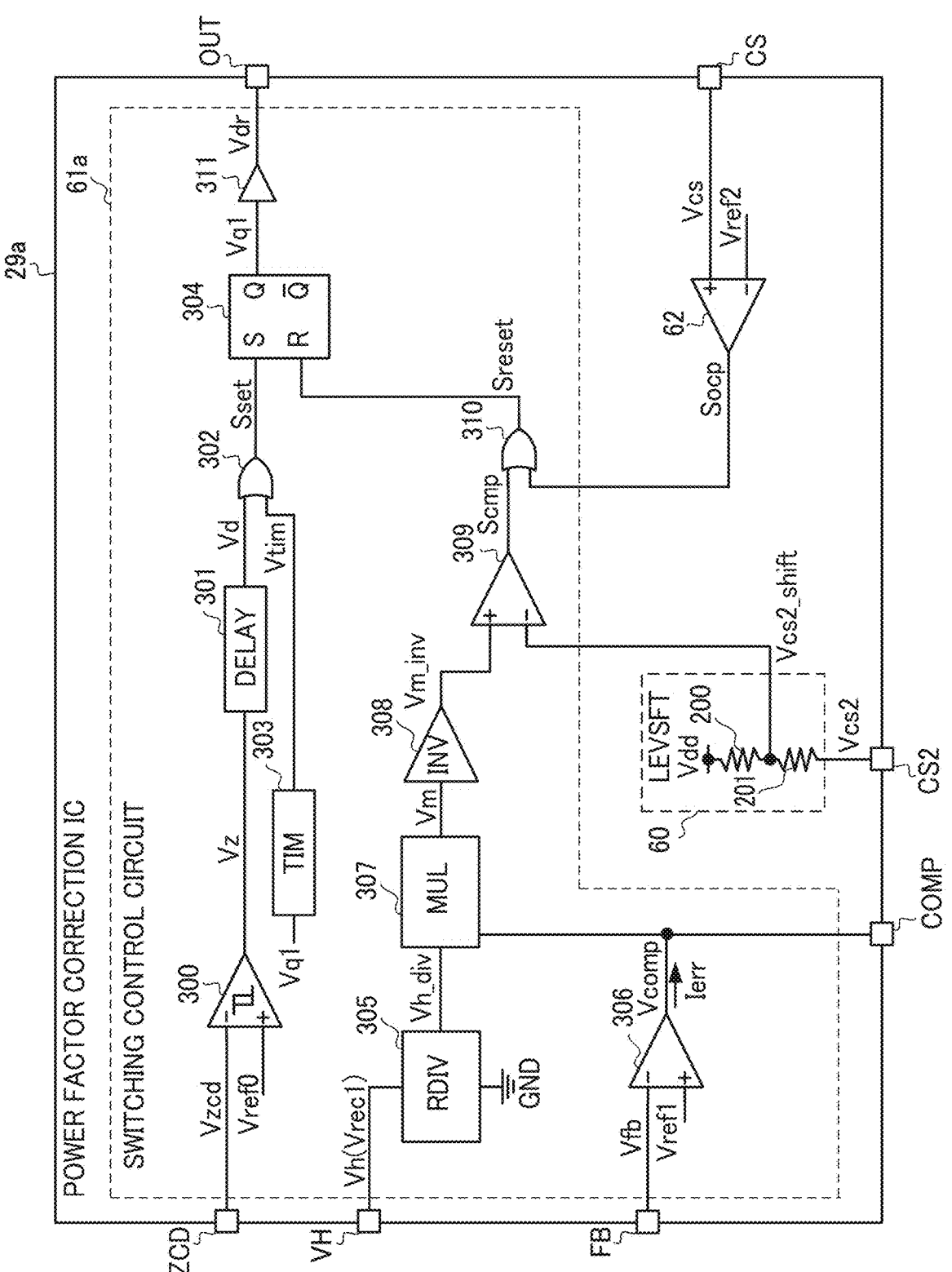

FIG. 5 illustrates a configuration example of the power factor correction IC 29*a*. The power factor correction IC 29*a* switches the MOS transistors 40 such that the waveform of the input current Iin will be similar to the waveform of the AC voltage Vac, based on the voltage Vcs2 applied to the terminal CS2 in FIG. 1, the rectified voltage Vrec1 applied to the terminal VH, and the output voltage Vout.

Here, "similar" means that the waveform of AC voltage Vac and the waveform of input current Iin are in phase, and have a positive proportional relationship in amplitude, and the phrase "such that . . . will be similar" refers to bringing the power factor close to 1.

The power factor correction IC 29*a* includes a level shifter circuit 60, a switching control circuit 61*a*, and a comparator 62.

===Level Shifter Circuit 60===

The level shifter circuit 60 shifts, by a predetermined voltage V1 (>0), the level of the voltage Vcs2 that is negative, to thereby output a voltage Vcs2_shift that is positive. Specifically, the level shifter circuit 60 includes a resistor 200 that receives the power supply voltage Vdd, and a resistor 201 provided between the resistor 200 and the terminal CS2, and outputs the voltage Vcs2_shift from the connection point between the resistors 200 and 201.

Note that the resistance values of the resistors 200 and 201 are determined so as not to affect the detection of the current It by the resistor 42. Further, the voltage Vcs2_shift corresponds to a "second voltage".

Figure 6:
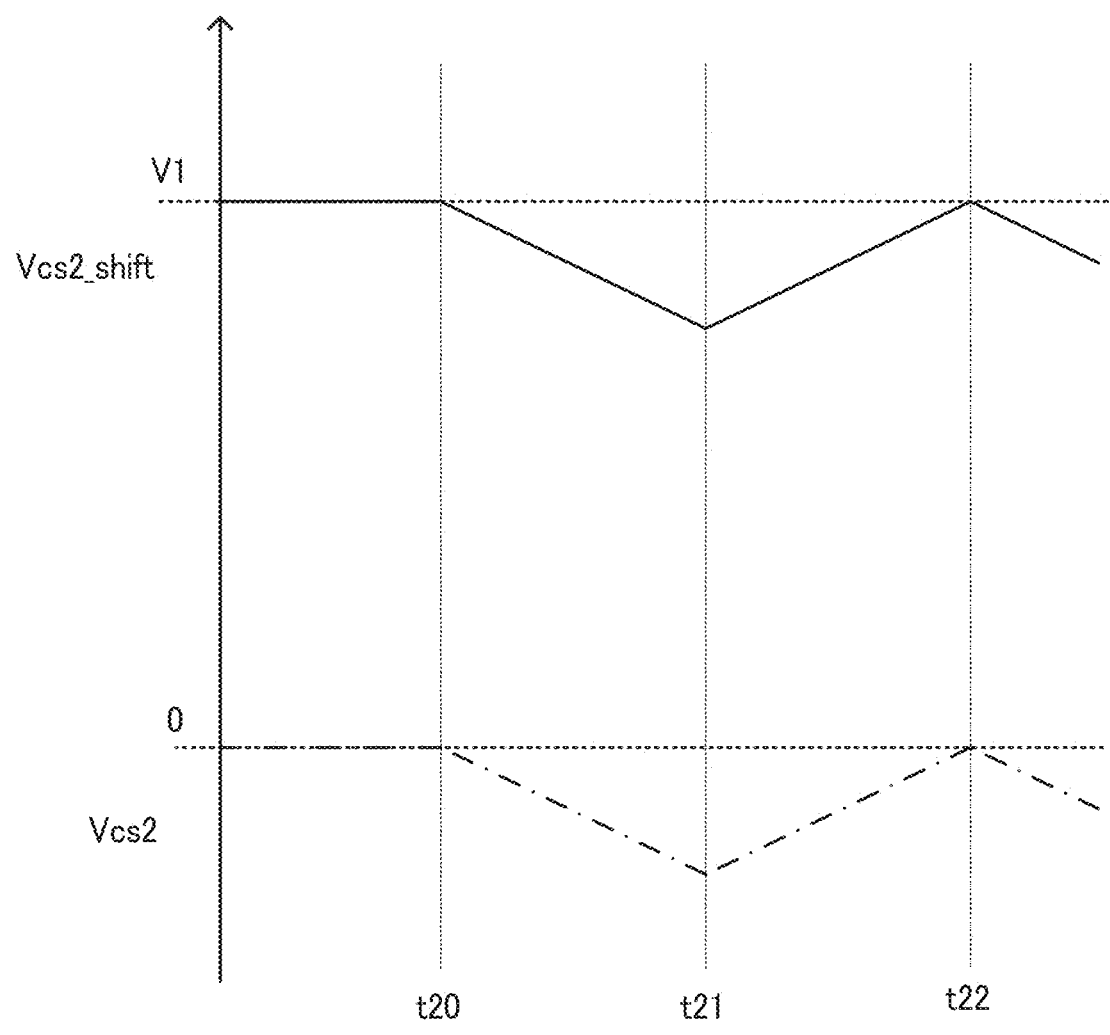
FIG. 6 is a diagram illustrating an operation of a level shifter circuit 60.

FIG. 6 is a diagram illustrating the relationship between the voltage Vcs2 (dashed dotted line) and the level-shifted voltage Vcs2_shift (solid line).

For example, in a time period before time t20, when the current flowing through the resistor 42 in FIG. 1 is "0", the voltage Vcs2 is also "0 V". As a result, the voltage Vcs2_shift results in the voltage V1.

Then, upon turning on of the MOS transistor 40 at time t20, for example, the inductor current IL increases, and thus the voltage Vcs2 drops from "0 V". Accordingly, the voltage Vcs2_shift, obtained by level-shifting the voltage Vcs2, also drops from the voltage V1.

Further, upon turning off of the MOS transistor 40 at time t21, for example, the inductor current IL decreases, and thus the voltage Vcs2 rises, and, for example, reaches 0 V at time t22. Thus, the voltage Vcs2_shift also results in the voltage V1 at time t22.

As such, the voltage Vcs2_shift in an embodiment of the present disclosure, for example, reaches the voltage V1 when the inductor current IL is "0", and drops from the voltage V1 when the inductor current IL increases.

==Switching Control Circuit 61a==

The switching control circuit 61a in FIG. 5 switches the MOS transistor 40, based on the inductor current IL and the output voltage Vout. Specifically, the switching control circuit 61a turns on the MOS transistor 40, in response to the inductor current IL becoming smaller than zero.

Meanwhile, the switching control circuit 61a turns off the MOS transistor 40, based on the voltage Vcs2, such that the waveform of the peak value of the current It corresponding to the sum of the current If and the inductor current IL will be similar to the waveform of the rectified voltage Vrec1.

The switching control circuit 61a includes a hysteresis comparator 300, a delay circuit 301, an OR circuits 302 and 310, a restart timer 303, an SR flip-flop 304, a voltage divider circuit 305, an error amplifier circuit 306, a multiplier circuit 307, an inverting amplifier circuit 308, and a comparator 309 and a buffer 311.

The hysteresis comparator 300 detects whether the inductor current IL has reached zero, based on the voltage Vzcd applied to the terminal ZCD. Since the auxiliary coil L2 is electromagnetically coupled to the main coil L1, the voltage Vzcd applied to the terminal ZCD results in a voltage corresponding to the inductor current IL flowing through the main coil.

Specifically, the hysteresis comparator 300 has threshold values Vthl and Vthh, and compares the voltage Vzcd with the threshold value Vthl in the case of indicating that the inductor current IL is zero and the threshold value Vthh in the case of indicating that the inductor current IL has increased.

The hysteresis comparator 300 outputs a high signal Vz to the delay circuit 301, when the inductor current IL decreases to zero. Meanwhile, when the inductor current IL increases and the voltage Vzcd exceeds the threshold Vthh, the hysteresis comparator 300 outputs a low signal Vz to the delay circuit 301.

Further, the threshold value Vthl is a lower one of the threshold values of the hysteresis comparator 300 according to the reference voltage Vref0 applied to the hysteresis comparator 300. Similarly, the threshold value Vthh is a higher one of the threshold values of the hysteresis comparator 300 according to the reference voltage Vref0.

The delay circuit (DELAY) 301 outputs a pulse signal Vd to turn on the MOS transistor 40, after the delay period tch has elapsed since the inductor current IL reaches zero. Specifically, the delay circuit 301 outputs a high pulse signal Vd, in response to the delay period tch, which is a half period of the resonance period when the coil L1 and the output capacitance Coss resonate, having elapsed since the inductor current IL reaches zero.

The OR circuit 302 calculates the logical sum of the pulse signal Vd from the delay circuit 301 and a pulse signal Vtim from the restart timer 303 (described later). Accordingly, the OR circuit 302 outputs a high ON signal Sset, upon receiving the pulse signal Vd from the delay circuit 301 or the pulse signal Vtim from the restart timer 303.

The restart timer (TIM) 303 outputs the pulse signal Vtim, so as to turn on the MOS transistor 40, when the MOS transistor 40 is not on for a predetermined time period. Specifically, the restart timer 303 outputs the pulse signal Vtim, when a drive signal Vql to drive the MOS transistor 40 is not high for the predetermined time period.

Meanwhile, when the drive signal Vql goes high during the predetermined time period, the restart timer 303 resets time measurement for the predetermined time period and restarts the time measurement. Accordingly, the restart timer 303 stops outputting the pulse signal Vtim, when the drive signal Vql goes high during the predetermined time period.

==SR Flip-Flop 304==

The SR flip-flop 304 changes a Q output, in response to the ON signal Sset and an OFF signal Sreset (described later), to thereby output a resultant signal as the drive signal Vql. Specifically, the SR flip-flop 304 outputs a high drive signal Vql, upon receiving the high ON signal Sset outputted by the OR circuit 302.

Meanwhile, the SR flip-flop 304 outputs a low drive signal Vql, upon receiving a high signal Sreset outputted by the OR circuit 310 (described later). Note that the SR flip-flop 304 is a flip-flop that prioritizes reset. Further, the SR flip-flop 304 corresponds to a "drive signal output circuit".

The voltage divider circuit (RDIV) 305 divides a voltage Vh (equal to the rectified voltage Vrec1 in FIG. 1) from the terminal VH, to thereby generate a voltage Vh_div.

The error amplifier circuit 306 is a transconductance amplifier, and discharges the capacitors 46 and 47 in FIG. 1 such that when the output voltage Vout exceeds the target level, the ON period of the MOS transistor 40 decreases.

Specifically, when the feedback voltage Vfb corresponding to the output voltage Vout is lower than the reference voltage Vref1, the error amplifier circuit 306 charges the capacitors 46 and 47 with a current Ierr. Meanwhile, when the feedback voltage Vfb is higher than the reference voltage Vref1, the error amplifier circuit 306 discharges the capacitors 46 and 47 with the current Ierr. Note that the voltage Vcomp at the terminal COMP corresponds to a "third voltage corresponding to the output voltage".

==Multiplier Circuit 307==

The multiplier circuit (MUL) 307 outputs a voltage Vm indicating the target value of the peak value of the current It according to the sum of the current If and the inductor current IL, based on the voltage Vh_div and the voltage Vcomp. Specifically, the multiplier circuit 307 multiplies the voltage Vh_div by the voltage Vcomp, to thereby output a resultant voltage as the voltage Vm. Note that the voltage Vcomp corresponds to the "third voltage corresponding to the output voltage", the voltage Vh_div corresponds to a "fourth voltage," and the voltage Vm corresponds to a "fifth voltage indicating a target value".

Here, the multiplier circuit 307 multiplies the voltage Vh_div by the voltage Vcomp indicating whether the output voltage Vout is higher or lower than the target level, to thereby determine the peak value of the current It. Note that the voltage Vh_div is used to reflect the waveform of the rectified voltage Vrec1 to the waveform of the peak value, and the voltage Vcomp is used to determine the amplitude of the waveform of the peak value. This enables the power factor correction IC 29a to cause the waveform of the peak value of the current It and the waveform of the rectified voltage Vrec0 to be similar to each other, while maintaining the output voltage Vout at the target level.

==Inverting Amplifier Circuit 308==

Figure 7:
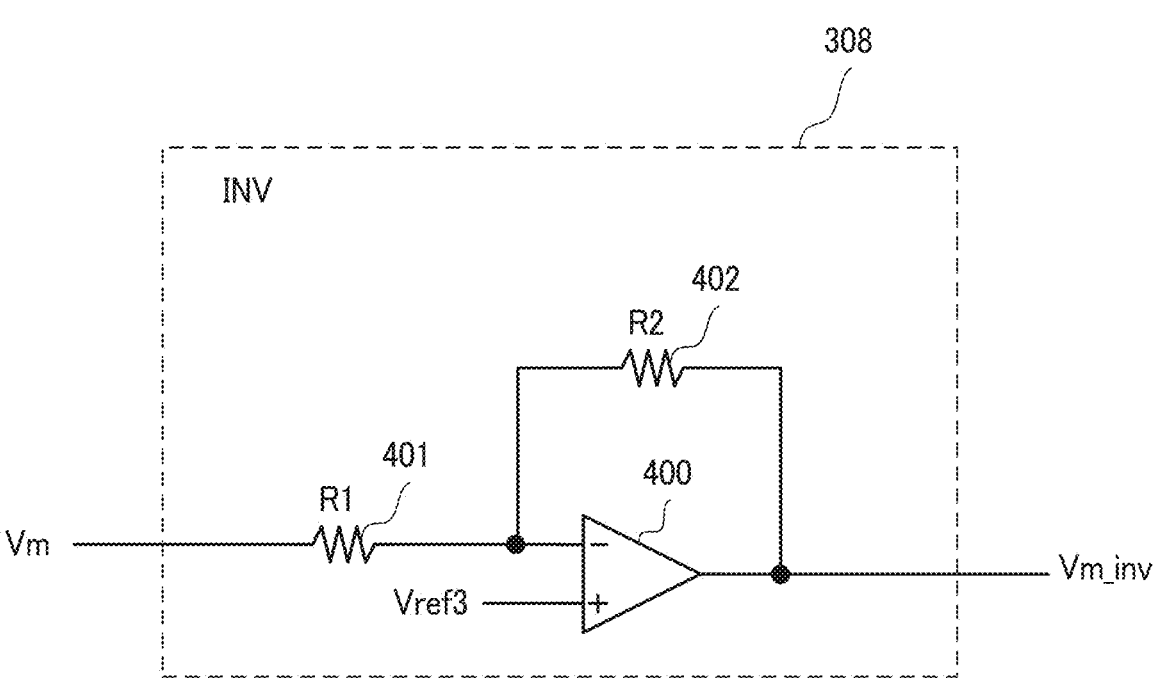
FIG. 7 is a diagram illustrating a configuration example of an inverting amplifier circuit 308.

The inverting amplifier circuit (INV) 308 inverts the voltage Vm, amplifies the inverted voltage with a predetermined gain, to thereby output a resultant voltage as a voltage Vm_inv. Specifically, the inverting amplifier circuit 308 includes an operational amplifier 400 and resistors 401 and 402, and is configured as illustrated in FIG. 7.

The relationship among the voltage Vm, the voltage Vm_inv, and a reference voltage Vref3 is given by the following expression.

$$Vref3 = \left(R1/(R1 + R2)\right) \times (\text{Vm\_inv} - Vm) + Vm \qquad \text{Expression (1)}$$

where R1 is the resistance value of the resistor 401, and R2 is the resistance value of the resistor 402.

When Expression (1) is transformed, the following expression is given.

$$\text{Vm\_inv} = -\left(R2/R1\right) \times Vm + \left(1 + R2/R1\right) Vref3 \qquad \text{Expression (2)}$$

Further, the resistance values R1 and R2 and the reference voltage Vref3 are determined such that (1+R2/R1) Vref3 is equal to the voltage V1 (that is, the voltage Vcs2_shift outputted by the level shifter circuit 60 when the voltage Vcs2 is 0 V).

By determining the resistance values R1 and R2 and the reference voltage Vref3 as such, the comparator 309 (described later) can substantially accurately compare the voltage Vm_inv and the voltage Vcs2_shift. Note that the inverting amplifier circuit 308 corresponds to an "inverting circuit", and the voltage Vm_inv corresponds to a "sixth voltage" and a "seventh voltage".

Figure 8:
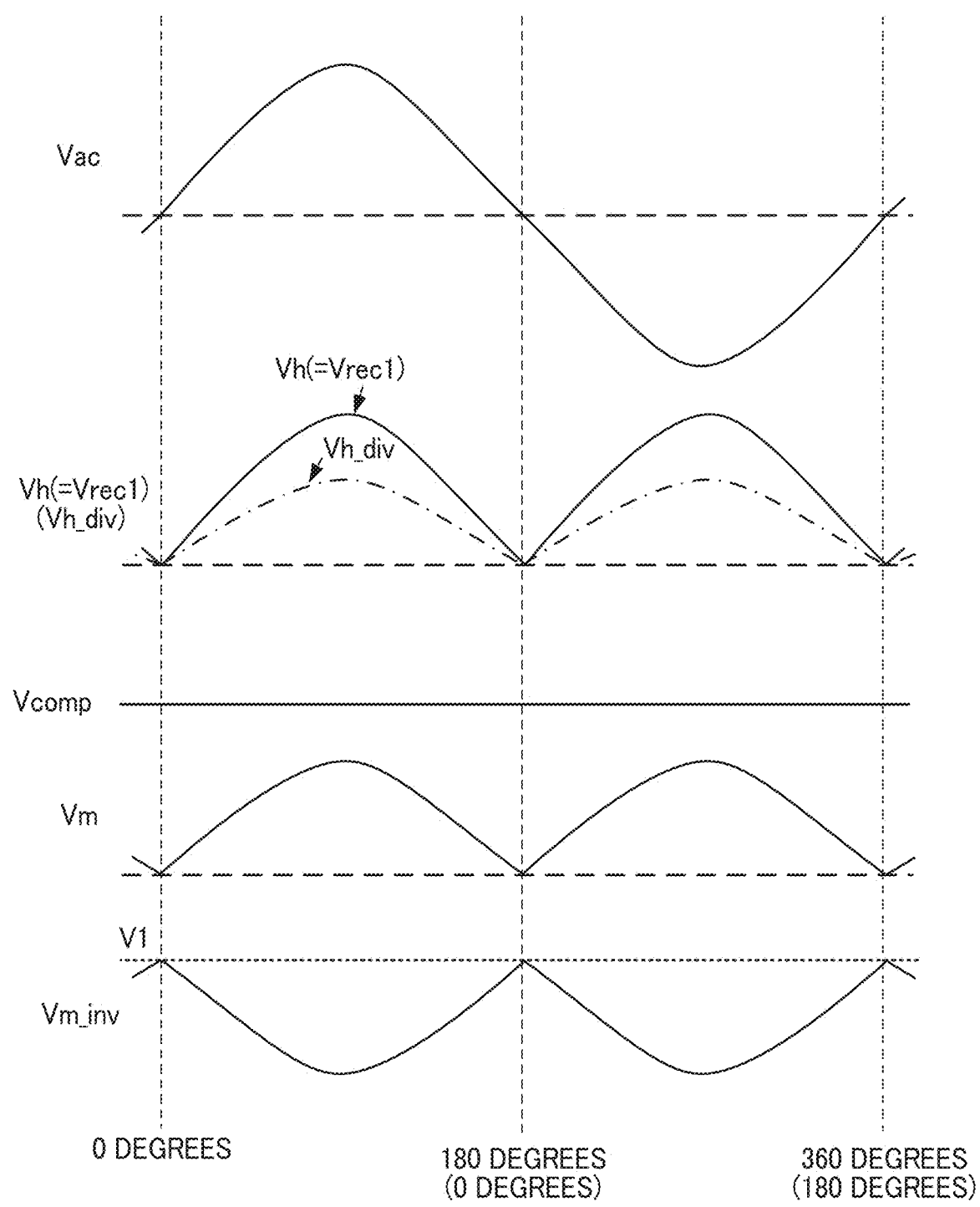
FIG. 8 is a diagram illustrating an operations of a multiplier circuit 307 and an inverting amplifier circuit 308.

The multiplier circuit 307 and the inverting amplifier circuit 308 operate as illustrated in FIG. 8, as the phase angle of the AC voltage Vac changes from 0 degrees to 360 degrees. Specifically, when the phase angle of the AC voltage Vac is 0 degrees, the voltage Vh_div reaches 0V, and the multiplier circuit 307 outputs the voltage Vm of 0 V. Then, the inverting amplifier circuit 308 outputs the voltage V1 as the voltage Vm_inv, as given by Expression (2). In FIG. 8, it is assumed that the voltage Vcomp is constant.

Further, when the phase angle of the AC voltage Vac is in the vicinity of 90 degrees, the voltage Vh_div reaches a voltage corresponding to the highest level of the AC voltage Vac, and the multiplier circuit 307 outputs the maximum voltage Vm. Then, the inverting amplifier circuit 308 outputs the voltage Vm_inv that has dropped to the lowest from the voltage V1. From then, even when the phase angle of the AC voltage Vac changes from 180 degrees to 360 degrees as well, the multiplier circuit 307 and the inverting amplifier circuit 308 operate in the same manner.

==Comparator 309==

The comparator 309 of FIG. 5 determines the timing at which the MOS transistor 40 is turned off. Specifically, the comparator 309 outputs a high signal Scmp, in response to the voltage Vcs2_shift reaching the level of the voltage Vm_inv. This means that the current It has reached the target value, and the switching control circuit 61a turns off the MOS transistor 40, in response to the voltage Vcs2_shift reaching the voltage Vm_inv indicating the target value of the peak value of the current It.

Meanwhile, when the level of the voltage Vcs2_shift is higher than the level of the voltage Vm_inv, the comparator 309 outputs a low signal Scmp. Note that the comparator 309 corresponds to a "first comparator circuit" and a "second comparator circuit".

The OR circuit 310 calculates the logical sum of the signal Scmp from the comparator 309 and a signal Socp rom the comparator 62 (described later).

The buffer 311 applies, to the MOS transistor 40, the voltage Vdr to turn on the MOS transistor 40, upon receiving the high drive signal Vql, and applies, to the MOS transistor, the voltage Vdr to turn off the MOS transistor 40, upon receiving the low drive signal Vql. As such, the buffer 311 drives the MOS transistor 40 having a large gate capacitance and the like.

==Comparator 62==

The comparator 62 detects whether the inductor current IL flowing through the MOS transistor 40 exceeds a predetermined current. Specifically, the comparator 62 compares the voltage Vcs generated with the inductor current IL flowing through the resistor 41, and a reference voltage Vref2.

Further, when the voltage Vcs is higher than the reference voltage Vref2, the comparator 62 outputs a high signal Socp to turn off the MOS transistor 40 to the switching control circuit 61a. Meanwhile, when the voltage Vcs is lower than the reference voltage Vref2, the comparator 62 outputs a low signal Socp. Note that the comparator 62 corresponds to an "overcurrent protection circuit".

<<<Operation of Power Factor Correction IC 29a>>>

Figure 9:
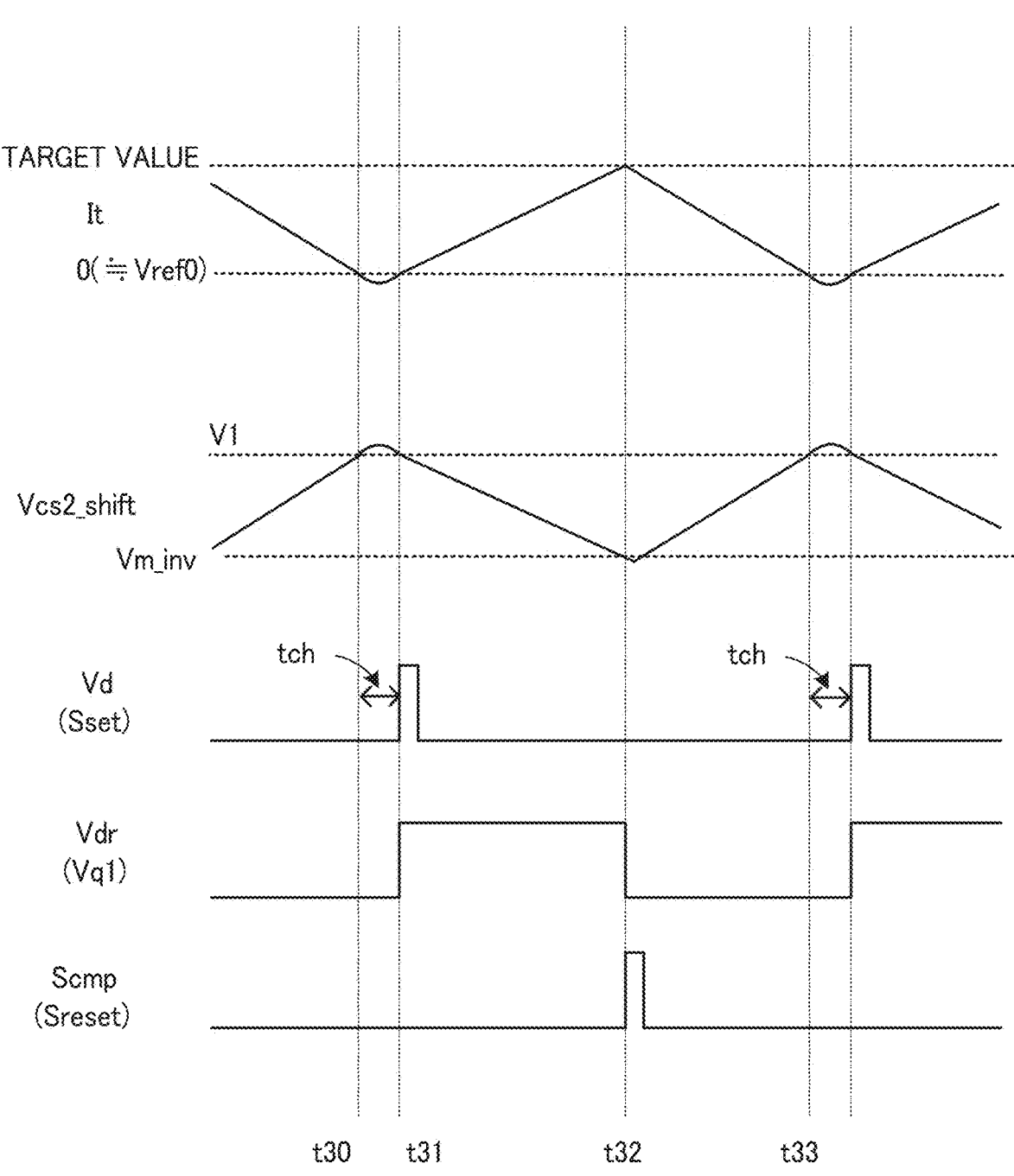

FIG. 9 is a diagram illustrating an example of the operation of the power factor correction IC 29a. Note that the power factor correction IC 29a turns on the MOS transistor 40, based on the inductor current IL, and turns off the MOS transistor 40, based on the current It. However, in FIG. 9, it is assumed that the current It flowing through the resistor 42 of FIG. 1 from the ground line LN2 to the terminal T3 of the full-wave rectifier circuit 23 is a positive current, and that when the inductor current IL is zero, the current If is also zero.

At time t30, the inductor current IL reaches zero, and the hysteresis comparator 300 outputs the high signal Vz (not illustrated).

At time t31 at which the delay period tch has elapsed since time t30, the delay circuit 301 outputs the pulse signal Vd, and the power factor correction IC 29a applies, to the MOS transistor 40, the voltage Vdr to turn on the MOS transistor 40. Thereafter, the current It increases.

At time t32 at which the voltage Vcs2_shift reaches the voltage Vm_inv, the comparator 309 outputs the high signal Scmp. Then, the power factor correction IC 29a applies, to the MOS transistor 40, the voltage Vdr to turn off the MOS transistor 40. Thereafter, the current It decreases.

At time t33 at which the inductor current IL reaches zero, the hysteresis comparator 300 outputs the high signal Vz. From then, the same or similar operation will be repeated.

The operation of the power factor correction IC 29a has been described above. With the power factor correction IC 29a operating as such, the waveform of the current value Iave, which is the average value of the current It, becomes similar to the waveform of the rectified voltage Vrec1. That is, the waveform of the input current Iin also becomes similar to the waveform of the AC voltage Vac.

Figure 10:
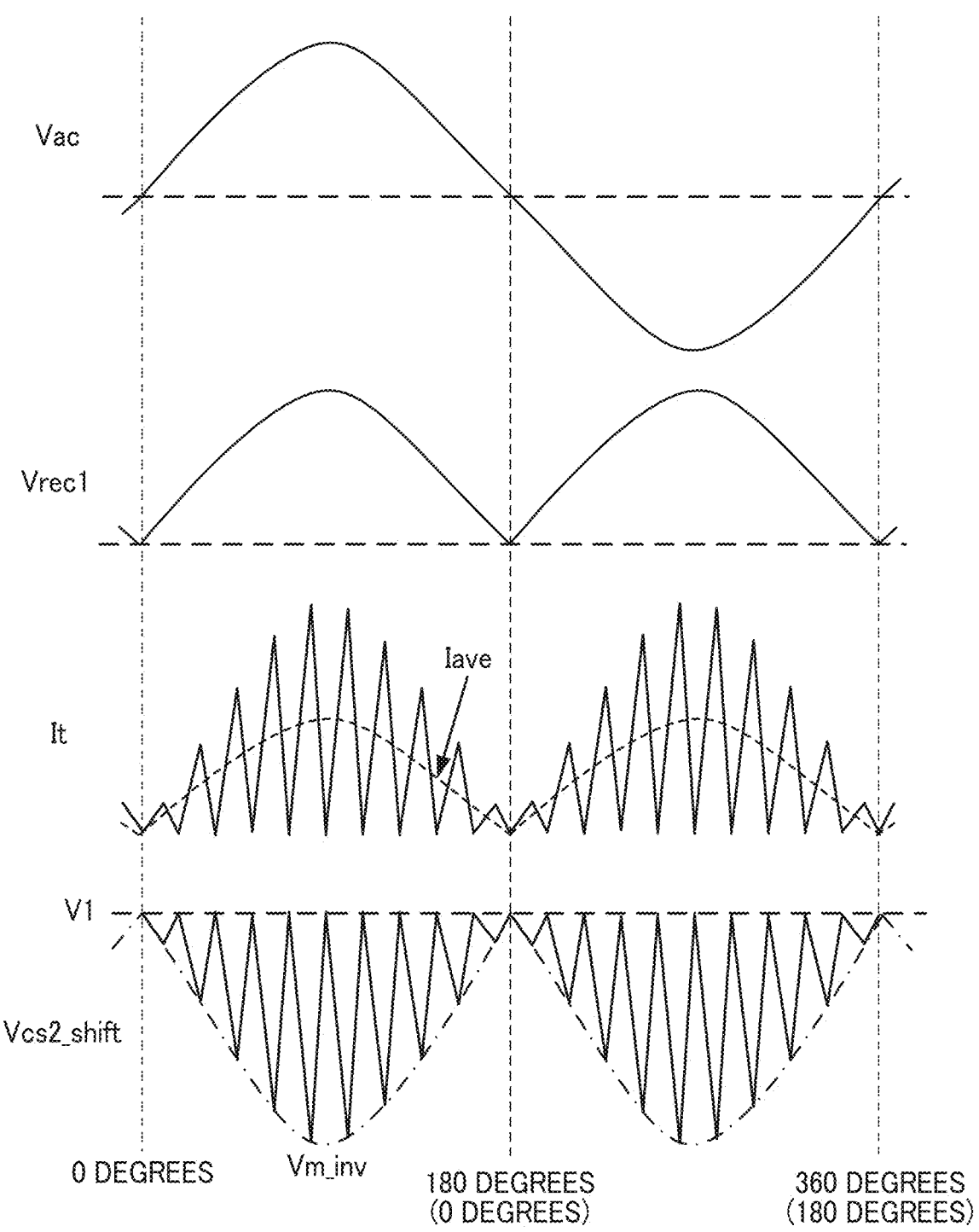
FIG. 10 is a diagram illustrating an operation of a power factor correction IC 29*a*.

FIG. 10 is a diagram illustrating the relationship between the current value Iave and the rectified voltage Vrec1. With the power factor correction IC 29a operating as explained with reference to FIG. 9, the peak value of the voltage Vcs2_shift, that is, the peak value of the current It becomes equal to the voltage Vm_inv indicating the alternating current component of the rectified voltage Vrec1.

This causes the waveform of the current value Iave to be similar to the waveform of the rectified voltage Vrec1, to thereby improve the power factor, and suppress the distortion of the input current Iin, to improve harmonic distortion as well, since control is performed considering the current If.

<<<Comparison of Simulation Results>>>

Figure 11:
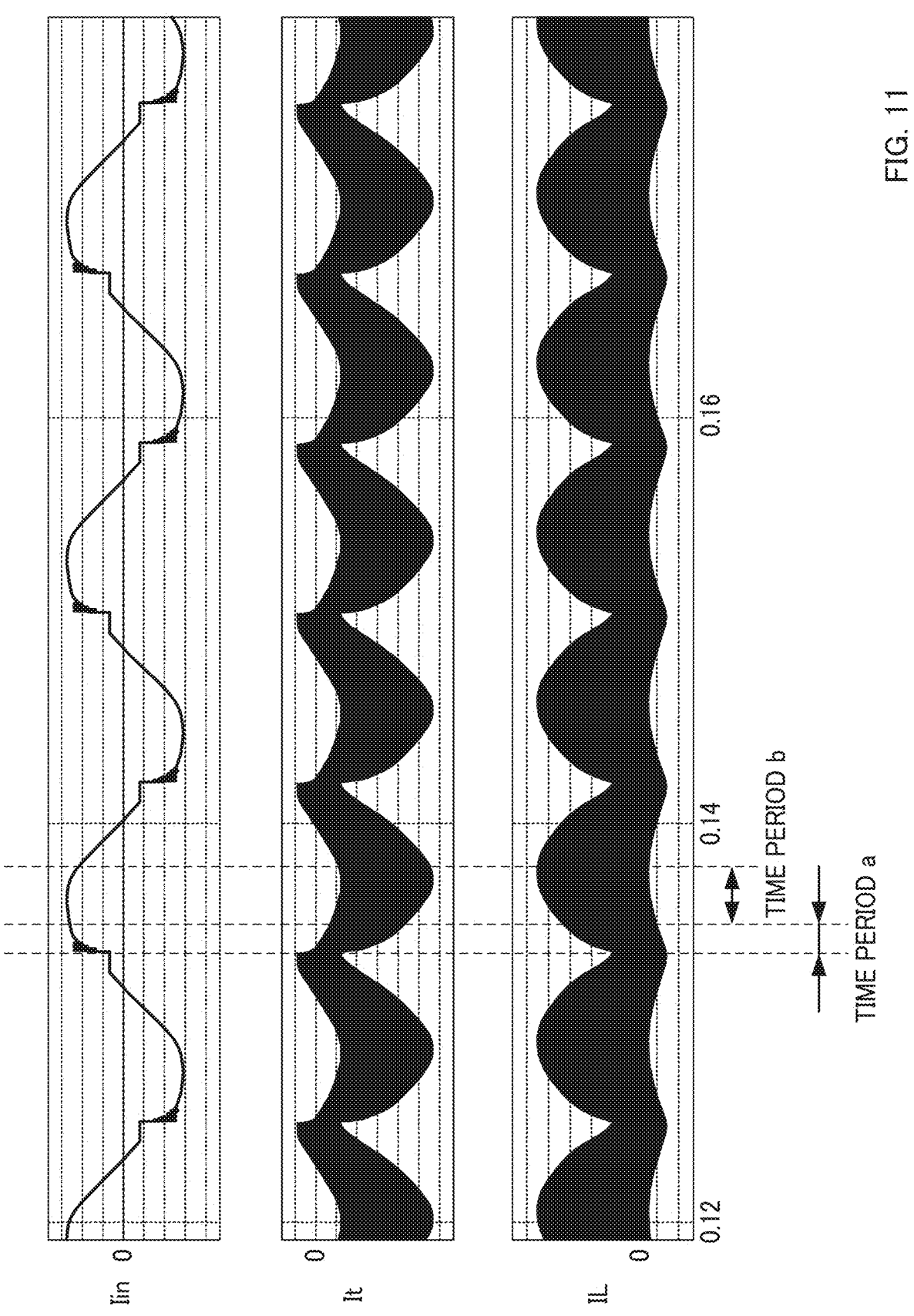
FIG. 11 is a diagram illustrating simulation results of a typical AC-DC converter 500.
Figure 12:
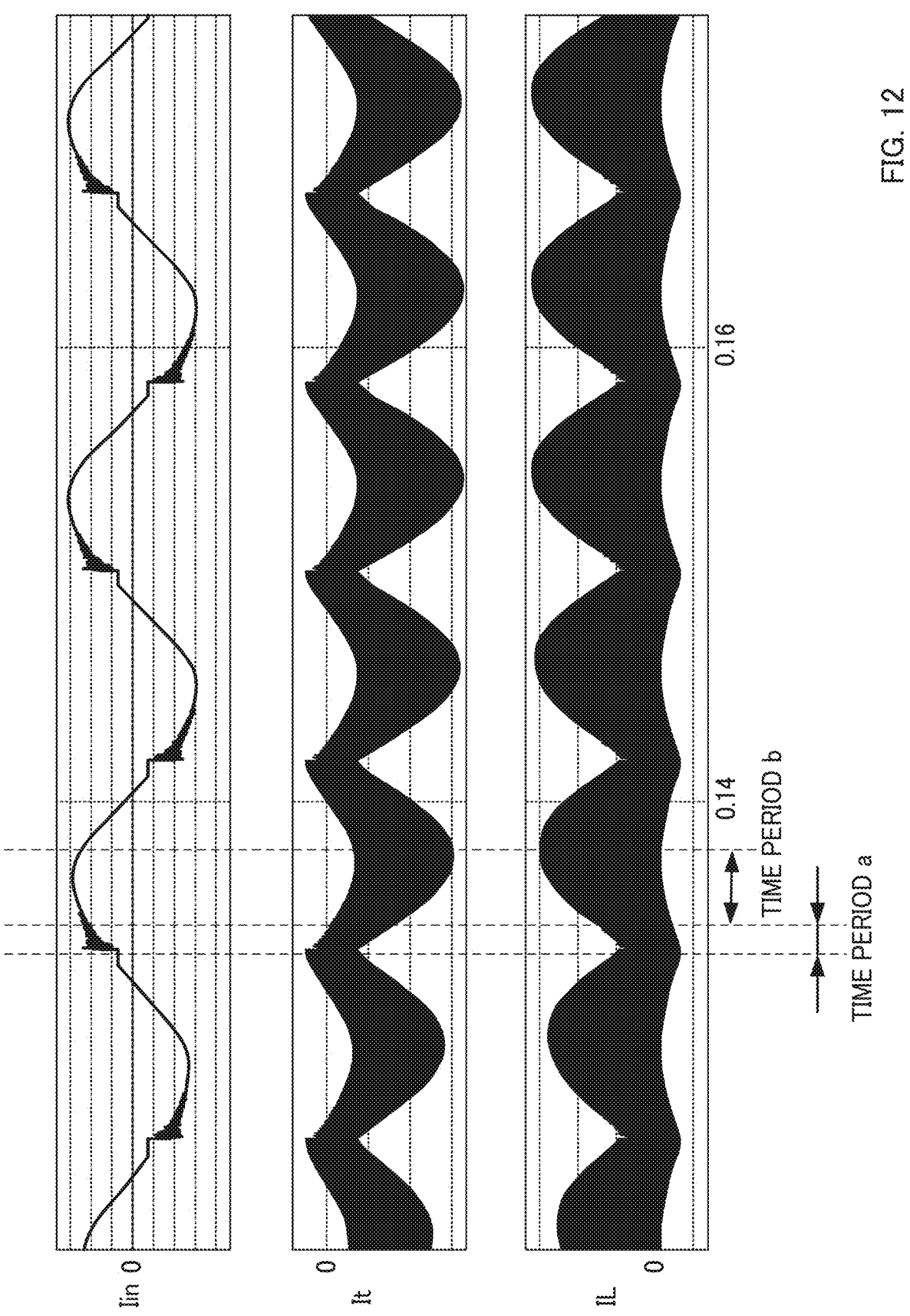
FIG. 12 is a diagram illustrating simulation results of an AC-DC converter 10*a*.

FIG. 11 is a diagram illustrating simulation results in the typical AC-DC converter 500, and FIG. 12 is a diagram illustrating simulation results in the AC-DC converter 10a.

In FIG. 11, when the current It (indicated by the voltage value generated at the resistor 42) and the inductor current IL are compared during a time period a given in the FIG. 11, the current It is relatively larger.

Meanwhile, in FIG. 11, when the current It and the inductor current IL are compared during a time period b given in FIG. 11, not much difference is found between the two.

Further, in FIG. 12, when the current It (indicated by the voltage value generated at the resistor 42) and the inductor current IL are compared during the time period a given in FIG. 12, not much difference can be found between the two, unlike the case in FIG. 11. The same applies to the time period b.

Further, when the time periods a are compared between FIGS. 11 and 12 focusing on the input current Iin, the amount of rapid increase in the input current Iin in FIG. 12 is smaller than the amount of rapid increase in the input current Iin in FIG. 11. Accordingly, with the power factor correction IC 29a controlling the AC-DC converter 10a, the distortion of the input current Iin decreases, to thereby improve harmonic distortion as well.

MODIFICATION EXAMPLES

====Configuration of Power Factor Correction IC 29b====

Figure 13:
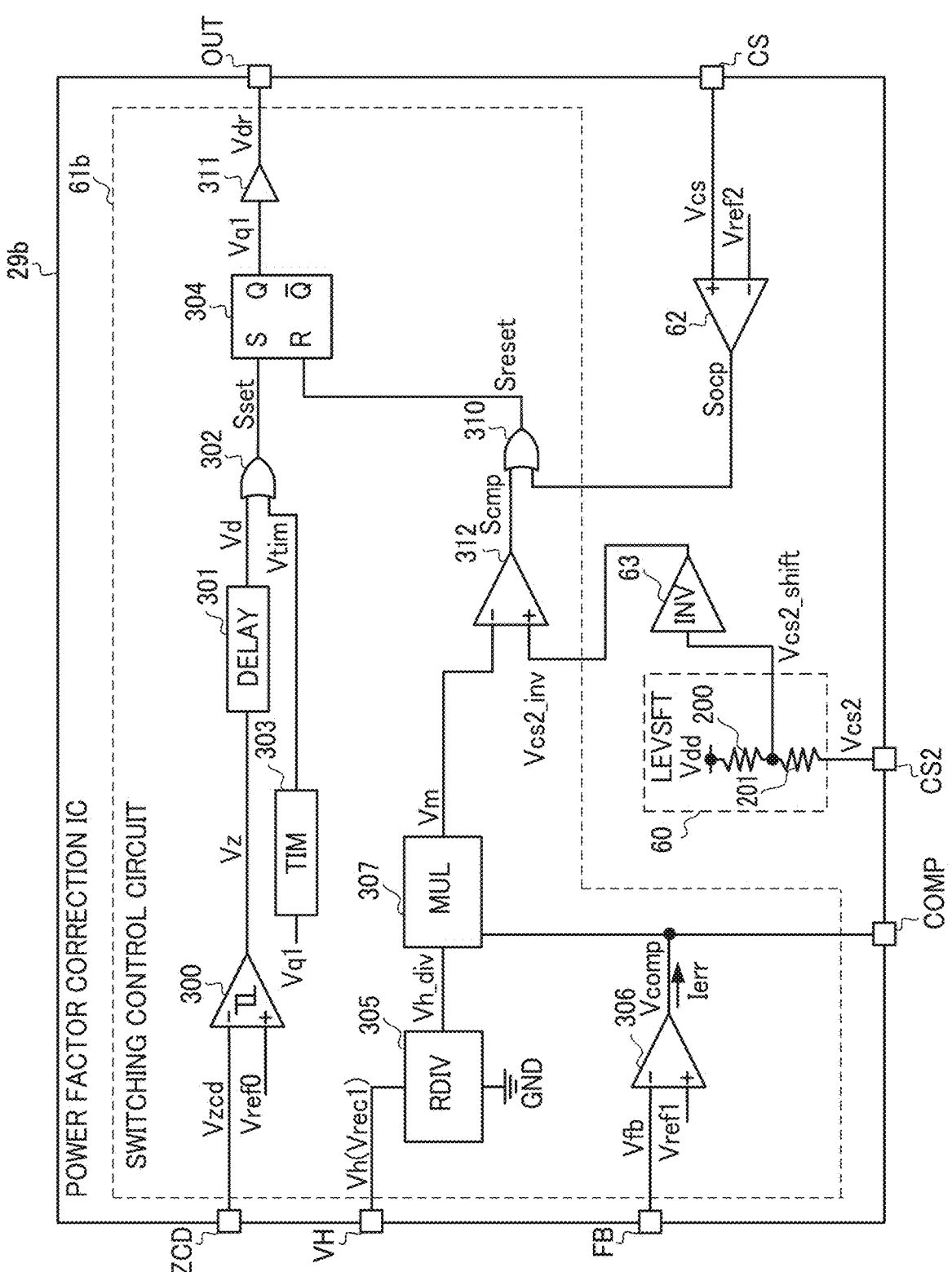
FIG. 13 is a diagram illustrating a configuration example of a power factor correction IC 29*b*.

The power factor correction IC 29a has been described above. FIG. 13 is a diagram illustrating a configuration example of a power factor correction IC 29b, which is a modification example of the power factor correction IC 29a. The power factor correction IC 29b includes the level shifter circuit 60, a switching control circuit 61b, the comparator 62, and an inverting amplifier circuit 63.

In the power factor correction IC 29b, the inverting amplifier circuit (INV) 63 inverts the voltage Vcs2_shift from the level shifter circuit 60 and applies the inverted voltage to the non-inverting input of a comparator 312 as a voltage Vcs2_inv.

Further, the voltage Vm from the multiplier circuit 307 is applied to the inverting input of the comparator 312. Then, in response to the level of the voltage Vcs2_inv reaching the level of the voltage Vm, the comparator 312 outputs the high signal Scmp. Note that the comparator 312 corresponds to a "first comparator circuit".

<<<Configuration of AC-DC Converter 10b>>>

Figure 14:
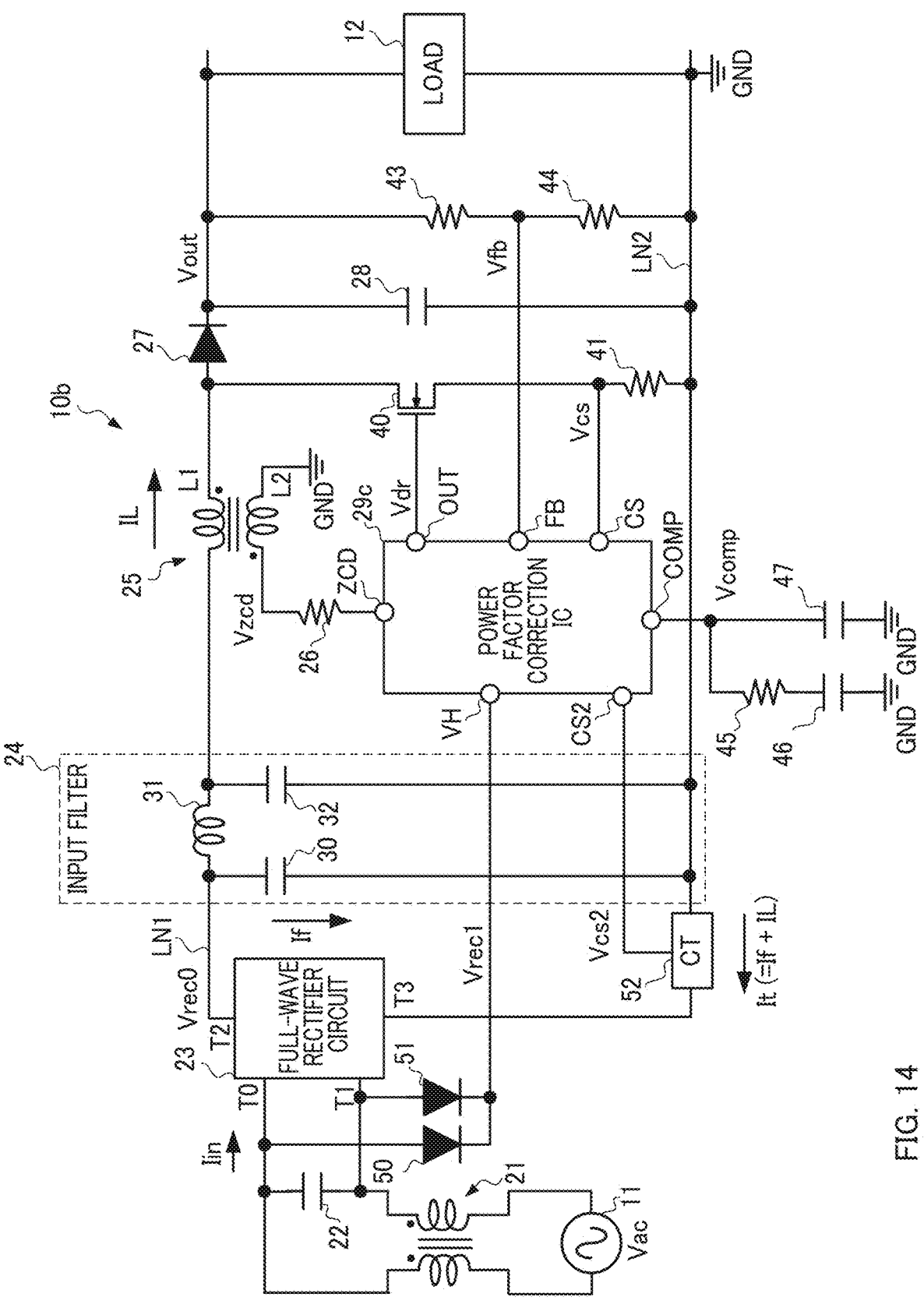
FIG. 14 is a diagram illustrating a configuration example of an AC-DC converter 10*b*.

FIG. 14 is a diagram illustrating a configuration example of an AC-DC converter 10b. In the AC-DC converter 10b, a current detection transformer (CT) 52 to detect the current It is provided in place of the resistor 42 in the AC-DC converter 10a. Further, the power factor correction IC 29a is replaced with a power factor correction IC 29c that receives the voltage Vcs2 from the current detection transformer 52.

==Configuration of Power Factor Correction IC 29c==

Figure 15:
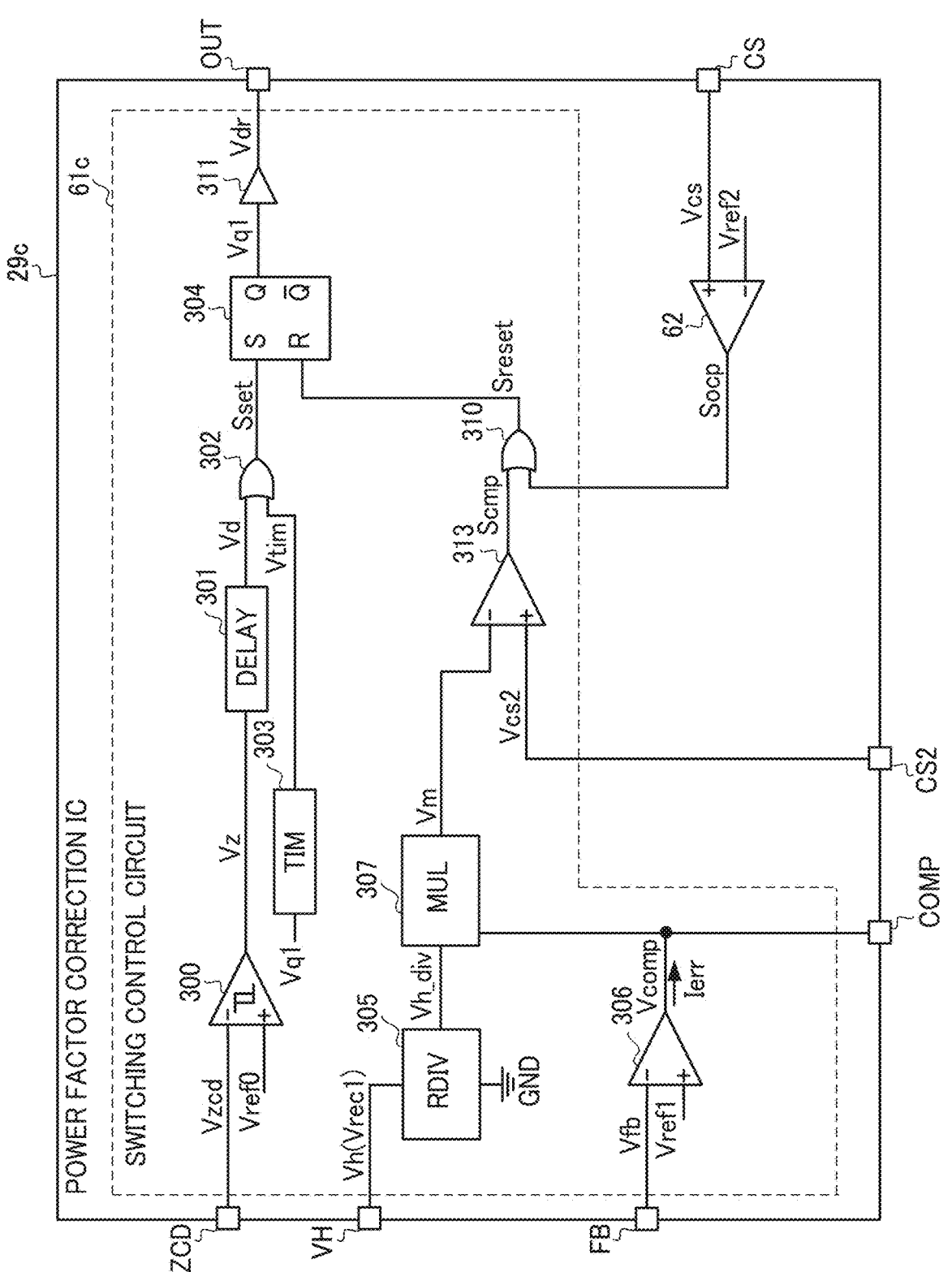
FIG. 15 is a diagram illustrating a configuration example of a power factor correction IC 29*c*.

FIG. 15 is a diagram illustrating a configuration example of the power factor correction IC 29c. The control IC 29c includes a switching control circuit 61c and the comparator 62. Note that the power factor correction IC 29c in FIG. 15 is illustrated assuming that the level of the voltage Vcs2 from the current detection transformer 52 is adjusted to a voltage level between the power supply voltage Vdd and the ground voltage.

Accordingly, in the power factor correction IC 29c, the level shifter circuit 60 that is included in the power factor correction IC 29a, 29b and connected to the terminal CS2 is removed. Further, a comparator 313 is provided in place of the comparator 309, 312.

The comparator 313 has a non-inverting input to receive the voltage Vcs2, and an inverting input to receive the voltage Vm from the multiplier circuit 307. Then, in response to the level of voltage Vcs2 reaching the level of voltage Vm, the comparator 313 outputs the high signal Scmp. Note that the comparator 313 corresponds to a "third comparator circuit".

===Summary===

The AC-DC converter 10a according to an embodiment of the present disclosure has been described above. The power factor correction IC 29a includes the terminal CS2 and the switching control circuit 61a. The voltage Vcs2 corresponding to the current It, which is the sum of the current If flowing from the input filter 24 to the ground and the inductor current IL, is applied to the terminal CS2. Thus, the current If for charging the capacitors 30 and 32 is taken into consideration in controlling the AC-DC converter 10a. This makes it possible to provide an integrated circuit capable of improving the total harmonic distortion of the input current of the power factor correction circuit.

Further, the power factor correction IC 29a includes the level shifter circuit 60, and the resistor 42 provided between the terminal T3 of the full-wave rectifier circuit 23 and the ground line LN2 is connected to the terminal CS2, the resistor 42 being configured to detect the current It. Then, the switching control circuit 61a turns off the MOS transistor 40, based on the voltage Vcs2_shift and the voltage Vm indicating the target value, which is the target value of the peak value of the current It, the target value corresponding to the rectified voltage Vrec1 and output voltage Vout. This enables the power factor correction IC 29a to cause the waveform of the peak value of the current It to be similar to the waveform of the rectified voltage Vrec0, thereby being able to improve the distortion of the input current Iin and bring the power factor closer to 1.

Further, the switching control circuit 61a, 61b includes the multiplier circuit 307, the inverting amplifier circuit 63 or 308, the comparator 309 or 312, and the SR flip-flop 304. This makes it possible to create the timing at which the MOS transistor 40 is turned off based on the voltage Vcs2 that is a negative voltage.

Further, the switching control circuit 61a includes the multiplier circuit 307, the inverting amplifier circuit 308, the comparator 309, and the SR flip-flop 304. In this case, the inverting amplifier circuit 308 inverts the voltage Vm from the multiplier circuit 307, and the frequency of the voltage to be inverted results in being lower than that in the case where the voltage Vcs2_shift is inverted. Accordingly, the inverting amplifier circuit 308 does not invert a high frequency signal, and thus the inverting amplifier circuit 308 may be with low functionality.

Further, the power factor correction IC 29a includes the terminal CS and the comparator 62. Accordingly, the power factor correction IC 29a has the terminal CS other than the terminal CS2, and the terminal CS2 used for switching the MOS transistor 40 during normal operation and the terminal CS to detect the inductor current IL flowing through the MOS transistor 40 are separately provided.

Further, the switching control circuit 61c includes the multiplier circuit 307, the comparator 313, and the SR flip-flop 304. This enables the power factor correction IC 29c to cause the waveform of the peak value of the current It to be similar to the waveform of the rectified voltage Vrec0, even if the current detection transformer 52 is used instead of the resistor 42, thereby being able to improve the distortion and total harmonic distortion of the input current Iin, and bring the power factor to 1.

The present disclosure is directed to provision of an integrated circuit capable of improving the total harmonic distortion of an input current of a power factor correction circuit.

According to the present disclosure, it is possible to provide an integrated circuit capable of improving the total harmonic distortion of an input current of a power factor correction circuit.

Hereinabove, the present disclosure has been described using embodiments. However, the technical scope of the present disclosure is not limited to the range described in embodiments described above. It is apparent to those skilled in the art that embodiments described above can be variously altered or modified. It is apparent from the description of the scope of the claims that the technical scope of the present disclosure includes embodiments altered or modified as such and equivalents thereof without departing from its essential features.

It should be noted that the processes such as the operations, procedures, steps, stages, and the like performed by the device, system, program, and method described in the scope of the claims, description, and drawings can be executed in any order, as long as the order is not particularly and clearly indicated by "before," "prior to," and/or the like and, as long as the output from a previous process is not used in a subsequent process. Even if an operation flow is described by using term(s) such as "first", "next", and/or the like for convenience in the scope of the claims, description, and/or drawings, this does not necessarily mean that the process must be performed in this order.

What is claimed is:

1. An integrated circuit for a power supply circuit that generates an output voltage of a target level from an alternating current (AC) voltage inputted thereto, the power supply circuit including a full-wave rectifier circuit configured to rectify the AC voltage to thereby generate a rectified voltage, a filter configured to receive the rectified voltage from the full-wave rectifier circuit, an inductor configured to receive a voltage from the filter, and a transistor configured to control an inductor current flowing through the inductor, the integrated circuit being configured to switch the transistor, the integrated circuit comprising:

a first terminal configured to receive a first voltage corresponding to a sum of a first current, which flows from the filter to a ground, and the inductor current, the sum being a second current; and

16 a switching control circuit configured to turn on the transistor, in response to the inductor current becoming smaller than a predetermined value, and turn off the transistor based on the first voltage such that a waveform of a peak value of the second current and a waveform of the rectified voltage are in phase, and are proportional in amplitude, to each other.

2. The integrated circuit according to claim 1, further comprising:

a level shifter circuit configured to level-shift the first voltage, to thereby output a resultant voltage as a second voltage, wherein the power supply circuit further includes a resistor provided between a terminal of the full-wave rectifier circuit on a low potential side thereof and the ground, the resistor being connected to the first terminal, and being configured to detect the second current, and the switching control circuit turns off the transistor, based on the second voltage and a target value of the peak value of the second current, the target value corresponding to the rectified voltage and the output voltage.

3. The integrated circuit according to claim 2, wherein the switching control circuit includes a multiplier circuit configured to multiply a third voltage, which corresponds to the output voltage, by a fourth voltage, which is obtained by dividing the rectified voltage, to thereby output a fifth voltage indicating the target value, an inverting circuit configured to invert one of two voltages that include the fifth voltage and the second voltage, to thereby output a sixth voltage, a first comparator circuit configured to compare the other of the two voltages, with the sixth voltage, and a drive signal output circuit configured to output a drive signal to turn on the transistor, in response to the inductor current becoming smaller than the predetermined value, and output the drive signal to turn off the transistor, in response to said the other voltage reaching a level of the sixth voltage.

4. The integrated circuit according to claim 2, wherein the switching control circuit includes a multiplier circuit configured to multiply a third voltage, which corresponds to the output voltage, by a fourth voltage, which is obtained by dividing the rectified voltage, to thereby output a fifth voltage indicating the target value, an inverting circuit configured to invert the fifth voltage, to thereby output a seventh voltage, a second comparator circuit configured to compare the seventh voltage with the second voltage, and a drive signal output circuit configured to output a drive signal to turn on the transistor, in response to the inductor current becoming smaller than the predetermined value, and output the drive signal to turn off the transistor, in response to the second voltage reaching a level of the seventh voltage.

5. The integrated circuit according to claim 1, further comprising:

a second terminal configured to receive a voltage corresponding to the inductor current; and an overcurrent protection circuit configured to cause the switching control circuit to turn off the transistor, upon detecting that the inductor current is larger than a predetermined current, based on the voltage received at the second terminal.

6. The integrated circuit according to claim 1, wherein the power supply circuit further includes a resistor provided between a terminal of the full-wave rectifier circuit on a low potential side thereof and a ground, wherein the first terminal is connected to the resistor and the terminal of the full-wave rectifier circuit.

7. The integrated circuit according to claim 1, wherein the switching control circuit includes a multiplier circuit configured to multiply a third voltage, which corresponds to the output voltage, by a fourth voltage, which is obtained by dividing the rectified voltage, to thereby output a fifth voltage indicating a target value of the peak value of the second current, a third comparator circuit configured to compare the fifth voltage and the first voltage, and a drive signal output circuit configured to output a drive signal to turn on the transistor, in response to the inductor current becoming smaller than a predetermined value, and output the drive signal to turn off the transistor, in response to the first voltage reaching a level of the fifth voltage.

8. A power supply circuit configured to generate an output voltage of a target level from an alternating current (AC) voltage inputted thereto, the power supply circuit comprising:

a full-wave rectifier circuit configured to rectify the AC voltage, to thereby generate a rectified voltage;

a filter configured to receive the rectified voltage;

a resistor provided between a terminal of the full-wave rectifier circuit on a low potential side thereof and a ground;

an inductor configured to receive a voltage from the filter;

a transistor configured to control an inductor current flowing through the inductor; and an integrated circuit configured to switch the transistor, wherein the integrated circuit includes:

a first terminal configured to receive a first voltage corresponding a sum of a first current, which flows from the filter to the ground, and the inductor current, the sum being a second current, and a switching control circuit configured to turn on the transistor, in response to the inductor current becoming smaller than a predetermined value, and turn off the transistor based on the first voltage such that a waveform of a peak value of the second current and a waveform the rectified voltage are in phase, and are proportional in amplitude, to each other, and the first terminal is connected to the resistor and the terminal of the full-wave rectifier circuit.

9. An integrated circuit for a power supply circuit that generates an output voltage of a target level from an alternating current (AC) voltage inputted thereto, the power supply circuit including a full-wave rectifier circuit configured to rectify the AC voltage to thereby generate a rectified voltage, a filter configured to receive the rectified voltage from the full-wave rectifier circuit, an inductor configured to receive a voltage from the filter, a transistor configured to control an inductor current flowing through the inductor, and a current detection unit provided between the filter and the full-wave rectifier circuit, the integrated circuit being configured to switch the transistor, the integrated circuit comprising:

a first terminal configured to receive a first voltage generated at the current detection unit, the first voltage corresponding to a sum of a first current, which flows from the filter to a ground, and the inductor current, the sum being a second current; and a switching control circuit configured to turn on the transistor, in response to the inductor current becoming smaller than a predetermined value, and turn off the transistor, based on a target value of a peak value of the second current, the target value corresponding to the output voltage and the first voltage.

10. The integrated circuit according to claim 9, further comprising:

a level shifter circuit configured to level-shift the first voltage, to thereby output a resultant voltage as a second voltage, wherein the target value is based on the AC voltage and the output voltage, and the switching control circuit turns off the transistor, based on the target value and the second voltage.

11. The integrated circuit according to claim 10, wherein the switching control circuit includes a multiplier circuit configured to multiply a third voltage, which corresponds to the output voltage, by a fourth voltage, which is obtained by dividing the rectified voltage, to thereby output a fifth voltage indicating the target value;

an inverting circuit configured to invert one of two voltages that include the fifth voltage and the second voltage, to thereby output a sixth voltage;

a first comparator circuit configured to compare the other of the two voltages with the sixth voltage; and a drive signal output circuit configured to output a drive signal to turn on the transistor, in response to the inductor current becoming smaller than the predetermined value, and output the drive signal to turn off the transistor, in response to said the other voltage reaching a level of the sixth voltage.

12. The integrated circuit according to claim 10, wherein the switching control circuit includes:

a multiplier circuit configured to multiply a third voltage, which corresponds to the output voltage, by a fourth voltage, which is obtained by dividing the rectified voltage, to thereby output a fifth voltage indicating the target value, an inverting circuit configured to invert the fifth voltage, to thereby output a seventh voltage, a second comparator circuit configured to compare the seventh voltage with the second voltage, a drive signal output circuit configured to output a drive signal to turn on the transistor, in response to the inductor current becoming smaller than the predetermined value, and output the drive signal to turn off the transistor, in response to the second voltage reaching a level of the seventh voltage.

13. The integrated circuit according to claim 9, further comprising:

a second terminal configured to receive a voltage corresponding to the inductor current; and an overcurrent protection circuit configured to cause the switching control circuit to turn off the transistor, upon detecting that the inductor current is larger than a predetermined current, based on the voltage received at the second terminal.

14. The integrated circuit according to claim 9, wherein the current detection unit is a resistor provided between a terminal of the full-wave rectifier circuit on a low potential side thereof and the ground, and the first terminal is connected to the resistor and the terminal of the full-wave rectifier circuit.

15. The integrated circuit according to claim 9, wherein the switching control circuit includes a multiplier circuit configured to multiply a third voltage, which corresponds to the output voltage, by a fourth voltage, which is obtained by dividing the rectified voltage, to thereby output a fifth voltage indicating the target value;

a third comparator circuit configured to compare the fifth voltage and the first voltage, and a drive signal output circuit configured to output a drive signal to turn on the transistor, in response to the inductor current becoming smaller than the predetermined value, and output the drive signal to turn off the transistor, in response to the first voltage reaching a level of the fifth voltage.

\* \* \* \* \*